United States Patent
Bargeron et al.

(10) Patent No.: US 7,747,943 B2
(45) Date of Patent: Jun. 29, 2010

(54) ROBUST ANCHORING OF ANNOTATIONS TO CONTENT

(75) Inventors: David M. Bargeron, Seattle, WA (US); Alice Jane Bernheim Brush, Seattle, WA (US); Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 931 days.

(21) Appl. No.: 09/949,028

(22) Filed: Sep. 7, 2001

(65) Prior Publication Data

US 2004/0205542 A1 Oct. 14, 2004

(51) Int. Cl.
*G06F 17/00* (2006.01)

(52) U.S. Cl. ............... 715/235; 715/201; 715/202; 715/203; 345/619; 382/217

(58) Field of Classification Search ........... 379/93.24; 715/512, 517, 234–240; 382/173
See application file for complete search history.

(56) References Cited

U.S. PATENT DOCUMENTS

| | | | |
|---|---|---|---|
| 4,649,499 A | 3/1987 | Sutton et al. | |
| 5,146,552 A * | 9/1992 | Cassorla et al. | 715/512 |
| 5,333,266 A | 7/1994 | Boaz et al. | |
| 5,524,193 A | 6/1996 | Covington et al. | |
| 5,526,407 A | 6/1996 | Russell et al. | |
| 5,572,643 A | 11/1996 | Judson | |
| 5,583,980 A | 12/1996 | Anderson | |
| 5,600,775 A | 2/1997 | King et al. | |
| 5,621,871 A | 4/1997 | Jaremko et al. | |
| 5,633,916 A | 5/1997 | Goldhagen et al. | |
| 5,699,089 A | 12/1997 | Murray | |
| 5,732,216 A | 3/1998 | Logan et al. | |
| 5,809,250 A | 9/1998 | Kisor | |
| 5,838,313 A | 11/1998 | Hou et al. | |
| 5,848,407 A * | 12/1998 | Ishikawa et al. | 707/2 |
| 5,893,087 A | 4/1999 | Wlaschin et al. | |
| 5,893,110 A | 4/1999 | Weber et al. | |
| 5,903,892 A | 5/1999 | Hoffert et al. | |
| 5,923,848 A | 7/1999 | Goodhand et al. | |
| 5,969,716 A | 10/1999 | Davis et al. | |
| 5,991,365 A | 11/1999 | Pizano et al. | |
| 6,006,241 A | 12/1999 | Purnaveja et al. | |

(Continued)

FOREIGN PATENT DOCUMENTS

EP 0560126 4/1995

(Continued)

OTHER PUBLICATIONS

David Bargeron, Robust annotation positioning in digital documents, Apr. 5, 2001, vol. 3, Issue 1, ACM Press, pp. 285-292.*

(Continued)

*Primary Examiner*—Doug Hutton
*Assistant Examiner*—Quoc A Tran
(74) *Attorney, Agent, or Firm*—Perkins Coie LLP

(57) ABSTRACT

Annotations are robustly anchored to content. The robust anchoring allows annotations to be associated with the content independently of the format used to store the content. The annotations can be re-anchored to the content after the content has been modified, including modifications to the format used to store the content.

29 Claims, 15 Drawing Sheets

U.S. PATENT DOCUMENTS

| | | | |
|---|---|---|---|
| 6,009,462 | A | 12/1999 | Birrell et al. |
| 6,081,829 | A | 6/2000 | Sidana |
| 6,085,185 | A | 7/2000 | Matsuzawa et al. |
| 6,105,055 | A | 8/2000 | Pizano et al. |
| 6,122,647 | A | 9/2000 | Horowitz et al. |
| 6,173,287 | B1 | 1/2001 | Eberman et al. |
| 6,173,317 | B1 | 1/2001 | Chaddha et al. |
| 6,230,172 | B1 | 5/2001 | Purnaveja et al. |
| 6,243,708 | B1 | 6/2001 | deVries et al. |
| 6,262,732 | B1 | 7/2001 | Coleman et al. |
| 6,311,189 | B1 | 10/2001 | deVries et al. |
| 6,317,141 | B1 | 11/2001 | Pavley et al. |
| 6,324,555 | B1 * | 11/2001 | Sites ........................... 715/517 |
| 6,332,144 | B1 | 12/2001 | deVries et al. |
| 6,332,148 | B1 * | 12/2001 | Paine et al. .................. 715/512 |
| 6,360,234 | B2 | 3/2002 | Jain et al. |
| 6,360,236 | B1 | 3/2002 | Khan et al. |
| 6,366,296 | B1 | 4/2002 | Boreczky et al. |
| 6,389,434 | B1 * | 5/2002 | Rivette et al. ............... 715/512 |
| 6,438,566 | B1 | 8/2002 | Okuno et al. |
| 6,449,653 | B2 | 9/2002 | Klemets et al. |
| 6,452,615 | B1 | 9/2002 | Chiu et al. |
| 6,457,026 | B1 | 9/2002 | Graham et al. |
| 6,484,156 | B1 | 11/2002 | Gupta et al. |
| 6,563,913 | B1 * | 5/2003 | Kaghazian ................ 379/93.24 |
| 6,571,295 | B1 | 5/2003 | Sidana |
| 6,572,661 | B1 * | 6/2003 | Stern ....................... 715/501.1 |
| 6,584,478 | B1 | 6/2003 | Spertus |
| 6,597,808 | B1 * | 7/2003 | Guo et al. .................... 382/173 |
| 6,687,877 | B1 * | 2/2004 | Sastry et al. ................. 715/512 |
| 7,395,501 | B2 * | 7/2008 | Graham et al. .............. 715/254 |
| 2002/0049787 | A1 | 4/2002 | Keely et al. |
| 2002/0129057 | A1 | 9/2002 | Spielberg |
| 2002/0154120 | A1 | 10/2002 | Cullimore et al. |
| 2002/0198898 | A1 | 12/2002 | Werner |
| 2004/0078757 | A1 | 4/2004 | Golovchinsky et al. |
| 2006/0080598 | A1 | 4/2006 | Bargeron et al. |

FOREIGN PATENT DOCUMENTS

| | | |
|---|---|---|
| GB | 2301260 | 11/1996 |
| WO | WO9749251 | 12/1997 |

OTHER PUBLICATIONS

Rui, et al; "Constructing Table-of-Content for Videos"; ACM Multimedia Systems Journal, Special Issue Multimedia Systems on Video Libraries; vol. 7, No. 5; Sep. 1999; pp. 359-368.

Marshall; "Annotation: from paper books to the digital library"; Proc. of Digital Libraries '97; (Philadelphia, PA, Jul. 1997) pp. 131-140.

Cadiz, et al.; "Using Web Annotations for Asynchronous Collaboration Around Documents"; Proc. of CSCW '00; (Philadelphia, PA, Dec. 2000); pp. 309-318.

Gronbaek, et al.; "Webvise: Browser and Proxy Support for Open Hypermedia Structuring Mechanisms on the WWW"; Proc. of the Fifth International World Wide Web Conference; (Toronto, May 1999); pp. 253-268.

Wilcox, et al.; "Dynomite: A Dynamically Organized Ink and Audio Notebook"; Proc. of CHI '97; (Atlanta, Georgia, Mar. 1997); pp. 186-193.

Laliberte, et al.; "A Protocol for Scalable Group and Public Annotations"; 1997 NCSA Technical Proposal; http://www.hypernews.org/~liberte/www/scalable-annotations.html.

Davis, et al; "NotePals: Lightweight Note Sharing by the Group, for the Group"; Proceedings of Human Factors in Computer Systems: Chi 99; Pittsburgh, PA; May 15-20, 1999; pp. 338-345.

Carrer, et al; "An Annotation Engine for Supporting Video Database Population"; Multimedia Tools and Applications 5; 1997; Lkuwer Academic Publishers; pp. 233-258.

"Webster's Encyclopedic Unabridged Dictionary of the English Language"; 1989; Portland House; 3 pages.

Chen, et al.; "(1996) Video and Audio: Organization and Retreival in the WWW"; WhitePaper, Available at http://vosaic.com/corp/papers/www5.html; Archived Jan. 28, 1998.

"Synchronized Multimedia Integration Language (SMIL) 1.0 Specification"; W3C Recommendation; Jun. 15, 1998; http://www.w3.org/TR/1998/REC-SMIL-19980615.

Nerney; "RealNetworks unveils software line for Multimedia displays"; Network World; May 4, 1998; http://www.nwfusion.com/news/0504real.html. 2 pages.

Booker; "Microsoft and RealNetworks Wage Media War"; InternetWeek; Jul. 10, 1998; http://www.techweb.com/wire/story/TWB 19980710S0014. 2 pages.

Moseley, et al.; Microsoft Office 97, 2nd Ed.; Sybex Inc., 1997, pp. 756-763 and 812-816.

Neuwirth et al.; "Computer Support for Distributed Collaborative Writing: Defining Parameters of Interaction"; Proceedings of CCSW '94; Chapel Hill, NC, 1994; pp. 145-152.

Stanford Online; "Masters in Electrical Engineering"; http://scpd.standford.edu/ce/telecom/onlinedegree.html, 4 pages, printed Nov. 3, 2000.

Weber, et al.; "Marquee: A Tool for Real-Time Video Logging"; Proceeding of CHI '94; Boston, MA; Apr. 1994; ACM Press; pp. 58-64.

Wei, "Media Weaver-A Distributed Media Authoring System for Networked Schloarty Workspace"; Multimedia Tools and Applications; Jun. 2, 1997; Stanford University; pp. 1-21.

Roscheisen, et al; "Beyond Browsing: Shared Comments, SOAPs, Trails and On-Line Communities"; Computer Networks and ISON Systems 27 (1995); pp. 739-749.

Gould, et al; "Relativity Controller: Reflecting User Perspective in Document Spaces"; Adjunct Proceedings of INTERCHI '93; ACM Press; pp. 125-126.

Kim, et al; "VIRON: an Annotation-Based Video Information Retrieval System"; Proceeding of COMPSAC '96; Seoul, South Korea; Aug. 1996; IEEE Press; pp. 298-303.

"Third Voice Rips Holes in Web"; Story Location: http://wired./com/news/technology/0,1282,20636.html.; Jul. 9, 1999.

Lawton, et al; "The Knowledge Weasel Hypermedia Annotation System"; Proceedings of the Hypertext '93: Nov. 1993; ACM Press; pp. 107-117.

Lee, et al.; "Video Indexing-An Approach Based on Moving Object and Track"; Proceedings of the SPIE; vol. 1908; 1993; pp. 25-36.

Marshall; "Toward and ecology of hypertext annotation"; Proceedings of the Hypertext; Pittsburgh, PA; Jun. 1998; ACM Press; pp. 40-48.

Abowd, et al.; "Teaching and Learning as Multimedia Authoring: The Classroom 2000 Project"; Proceedings of the Multimedia '96; Boston MA; Nov. 1996; ACM Press; pp. 187-198.

Bessler, et al.; "DIANE: A Multimedia Annotation System"; Proceedings of the ECMAST '97; Milan Italy; May 1997; 16 pages.

Ovsiannikov, et al.; "Annotation Technology"; International Journal of Human Computer Studies; Apr. 1999; vol. 50; No. 4; pp. 329-362.

Calfonte, et al.; "Expressive Richness: A Comparison of Speech and Text as Media for Revision"; Proceedings of the CHI '91; ACM Press; pp. 21-26; 1991.

Davis, et al.;"CoNote System Overview"; 1995; 3 pages; Available at http://www.cs.cornell.edu/home/dph/annotation/annotations.html.

Gaines, et al.; "Open Architecutre Multimedia Documents"; Proceedings of the Multimedia '93; Anaheim CA; Aug. 1993; ACM Press; pp. 137-146.

Pizano, et al.; "Integrated Multimedia Messaging Concepts and Applications"; Proceedings of the 1996 ACM Symposium on Applied Computing; Philadelphia, Pennsylvania; ACM Press; pp. 12-16; 1996.

Lee, et al.; "Storage and Retrieval for Image and Video Databases"; Proceedings SPIE- The International Society for Optical Engineering; San Jose, CA; Feb. 2-3, 1993; vol. 1908; pp. 1-36.

Smith; "DynaText: An Electronic Publishing System"; Technical Review; pp. 415-420.

Phelps, et al; "Multivalent Annotations"; Published in Proceedings of the First European Conference on Research and Advanced Technology for Digital Libraries; Sep. 1-3, 1997; Pisa, Italy; 15 pages.

Neuwirth, et al.; "Distributed Collaborative Writing: A Comparison of Spoken and Written Modalities for Reviewing and Revising Documents"; Human Factors in Computing Systems; Apr. 24-28, 1994; Boston, Massachusetts; pp. 51-57.

Roscheisen, et al.; Shared Web Annotations As a Platform for Third-Party Value-Added Information Providers: Architecture, Protocols, and Usage Examples; Technical Report CSDTR/DLTR; Stanford University; 33 pages.

Schickler, et al.; "Pan-Browser Support for Annotations and Other Meta-Information on the World Wide Web"; Fifth International World Wide Web Conference; May 6-10, 1996; Paris, France; 14 pages.

Smith, et al.; "What Should a Wildebeest Say? Interactive Nature Films for High School Classrooms"; ACM Multimedia 97-Electronic Proceedings; Nov. 8-14, 1997; Seattle, WA; 18 pages.

Phelps, et al.; "Robust Intra-document Locations"; Proceedings of the 9th World Wide Web Conference; Amsterdam; May 2000; 18 pages.

Wojahn, et al.; "Effects of Interfaces for Annotation on Communication in a Collaborative Task"; CHI Conference Proceedings; Apr. 18-23, 1998; pp. 456-463.

Golovchinsky, et al.; "Moving Markup: Repositioning Freeform Annotations"; Proceedings of the 15th Annual ACM Symposium on User Interface Software and Technology; Oct. 27-30, 2002; Paris France; vol. 4; Issue 2; pages 21-29.

* cited by examiner

ROBUST ANCHORING OF ANNOTATIONS TO CONTENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to annotating content, and more particularly to robust anchoring of annotations to content.

BACKGROUND

As computing technology has advanced, increasingly powerful computing devices have become available. Such devices have led to an increase in the number of computing devices being used as well as an expansion of the manner in which these devices are being used. One such usage for computing devices is the generation and distribution of electronic or digital documents.

The transition to content authoring, revising, and distributing using computers rather than pen (or typewriter) and paper has created many benefits, but has not been without its problems. Some of these problems are rooted in the different manner in which content is authored and revised on computers rather than the more traditional paper methods. One specific problem is the annotating of content. Paper documents have been traditionally annotated manually, such as by highlighting or underlining of text and/or notes written in the margin of the paper. Annotating digital documents (e.g., documents which are being authored and revised on a computer) in a similar manner is difficult because digital documents are easily and frequently altered, thereby changing the portion of the document to which the annotation corresponds. It would thus be beneficial to provide a way to improve the manner in which annotations are associated with portions of documents so that the annotations are still associated with the correct portion of the document despite alterations to the underlying content.

SUMMARY

Robust anchoring of annotations to content is described herein.

According to one aspect, an annotation is associated with a particular portion of content by capturing multiple features of the portion. These features include one or more features describing a beginning point of the portion, one or more features describing an ending point of the portion, and one or more features describing the portion between the beginning point and the ending point. According to one implementation, these one or more features are captured independently of a format used to store the content.

According to another aspect, an annotation anchor that describes a region of content to which an annotation corresponds is reassociated with the content (or a modified version thereof). One or more features (for example, keywords) in the annotation anchor are identified, and one or more candidate regions of the modified version to which the annotation potentially corresponds are identified. A score is generated for the one or more regions, and the identified region having the best score is selected as the region of the modified version of the original content to which the annotation corresponds.

DETAILED DESCRIPTION

Robust anchoring of annotations to content is described herein. For each annotation, information describing the portion of the content to which the annotation corresponds is robustly captured, thereby "anchoring" the annotation to the portion of the content. This captured information, also referred to as an "anchor", includes information regarding a beginning point of the portion, an ending point of the portion, and the region between the two points. Subsequently, the content (including possibly the portion to which the annotation corresponds) can be modified, and the annotation re-anchored to the modified content.

Figure 1:
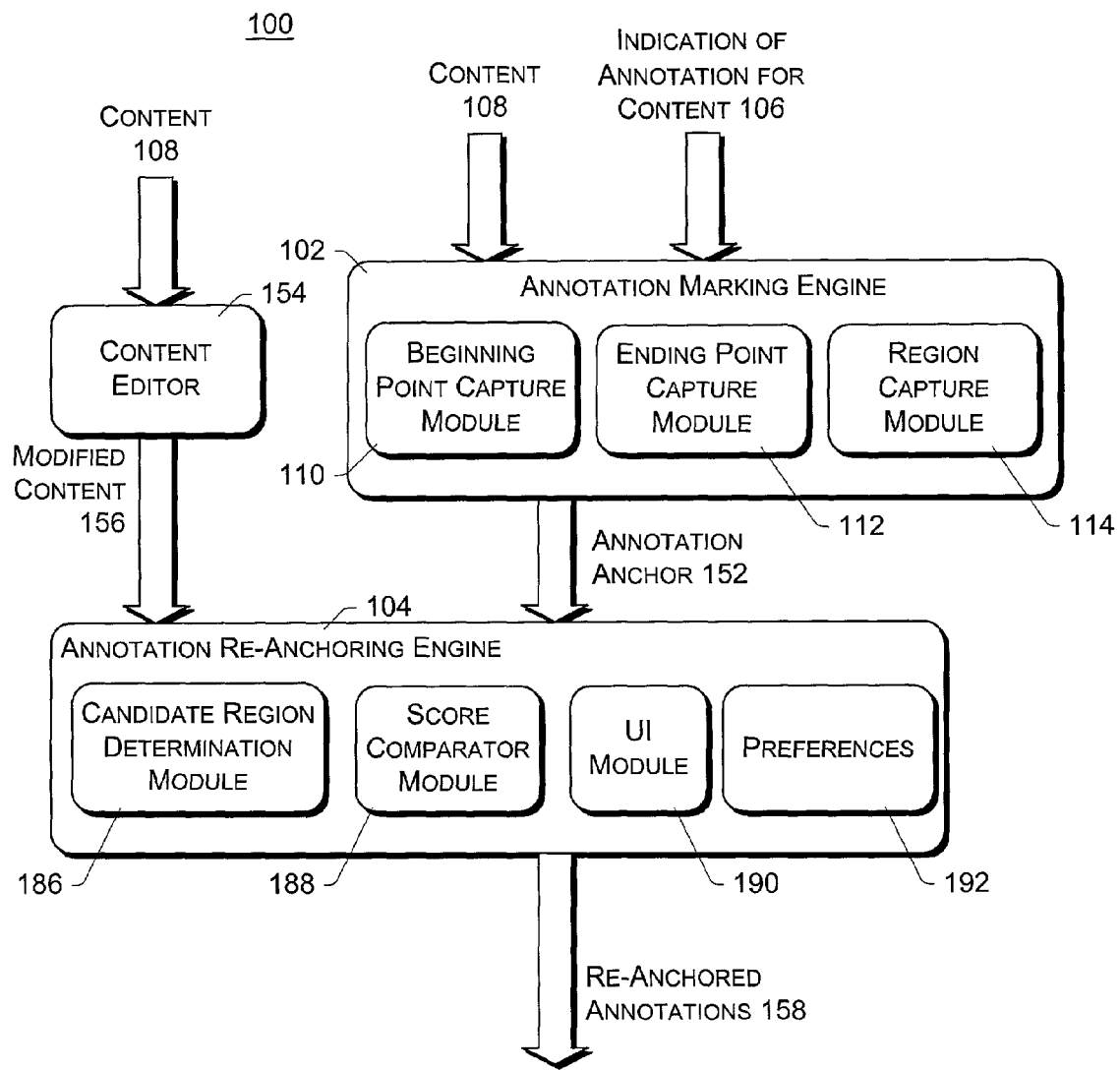
FIG. 1 is a block diagram illustrating an exemplary system for anchoring an annotation to content.

FIG. 1 is a block diagram illustrating an exemplary system 100 for anchoring an annotation to content. System 100 includes an annotation marking engine 102 and an annotation re-anchoring engine 104. Engines 102 and 104 may be implemented in the same computer, or alternatively in different computers. During operation, an indication 106 of an annotation corresponding to underlying content as well as the underlying content 108 are received at annotation marking engine 102. Indication 106 includes an identification of the portion of content 108 to which the annotation corresponds. This identification can be made in any of a wide variety of conventional manners, such as by identifying the page number, line number, and character number of where the portion begins and ends. Indication 106 can be received in any of a variety of manners. For example, a content authoring module (not shown) may receive an input from a user highlighting a portion of the content, and an indication of this input forwarded to engine 102. Annotations can correspond to a portion of content 108 explicitly identified by a user, or alternatively a single point explicitly identified by the user (and the portion of content 108 being implicitly identified).

Underlying content 108 can be any of one or more types of content, such as text content, audio content, video content, image content, etc., or combinations of one or more of these types of content. Underlying content 108 can be any type of content from which one or more partially- or uniquely-identifying robust features can be extracted. Similarly, the annotation generated by a user can be in any of a variety of types of content (e.g., text content, audio content, video content, image content, etc., or combinations thereof), and need not be of the same type of content as the underlying content 108 that it annotates. Any of a wide variety of conventional components can be used to generate the underlying content and/or the annotation content, including text editors and keyboards, microphones, image capture devices, etc.

Upon receipt of indication 106, annotation marking engine 102 robustly captures the beginning point of the portion, ending point of the portion, and region between the beginning and ending points of the region. This capturing is performed by a beginning point capture module 110, an ending point capture module 112, and a region capture module 114, respectively.

Figure 2:
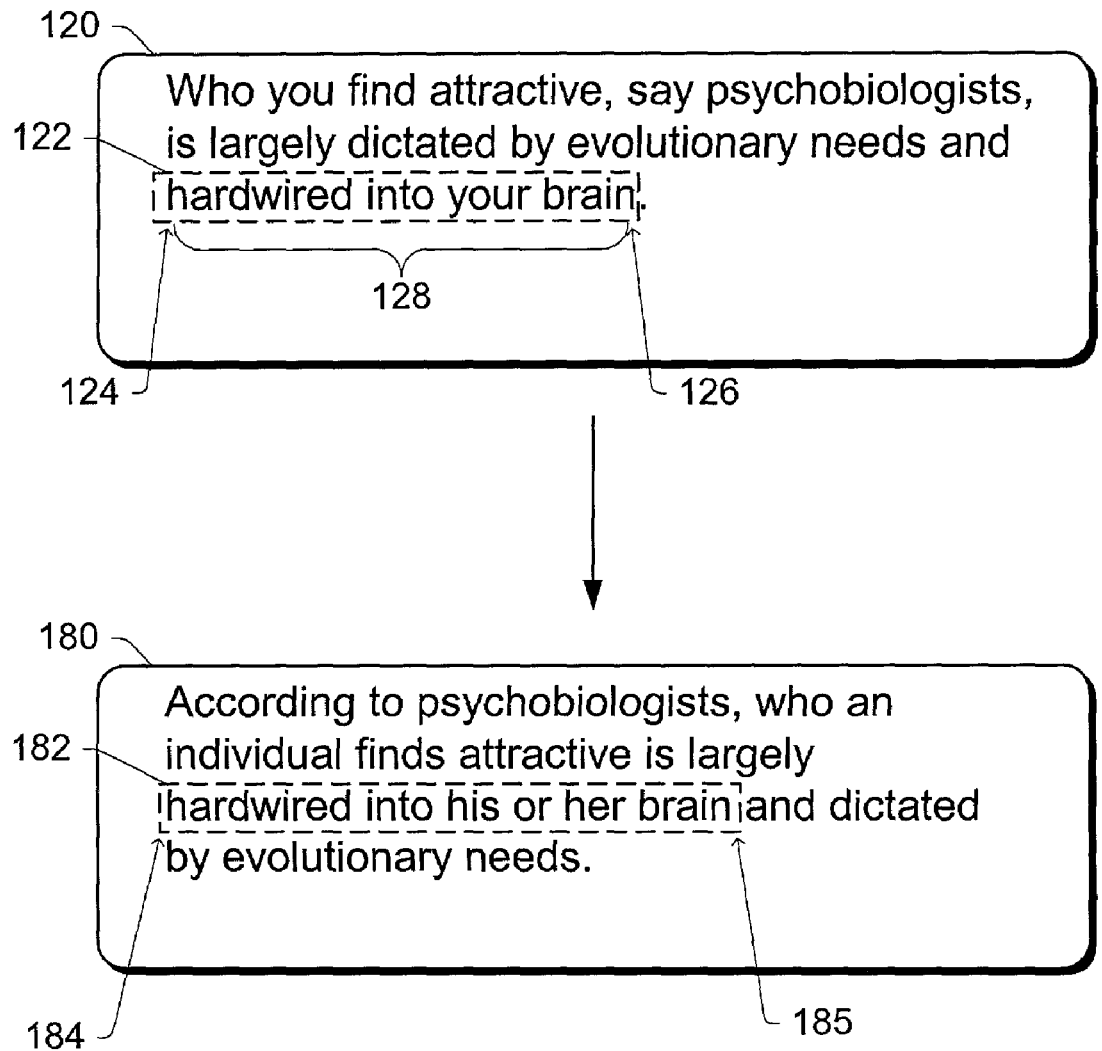
FIG. 2 illustrates exemplary content with a highlighted portion corresponding to an annotation.

FIG. 2 illustrates exemplary content with a highlighted portion or region corresponding to an annotation. In FIG. 2, an exemplary sentence is illustrated on a display 120 with a portion 122 highlighted. Although a dashed box is used on display 120 to indicate highlighting, alternatively highlighting can be indicated in a variety of other manners (such as changing the color or font of the highlighted text, marking the area surrounding the text with a different color, animating the text, etc.). With respect to highlighted portion 122, the beginning point 124 of the portion is at the letter "h" in "hardwired", the ending point 126 of the portion is at the letter "n" in "brain", and the region 128 is the characters between these points, inclusive (that is, "hardwired into your brain").

For text content, the beginning point refers to the first character in the highlighted portion, while the ending point refers to the last character in the highlighted portion. Alternatively, these points may be implemented in different manners. For example, the beginning point may be the character immediately preceding the first highlighted character, or the area between the first highlighted character and the character immediately preceding the first highlighted character. Similarly, the ending point may be the character immediately succeeding the last highlighted character, or the area between the last highlighted character and the character immediately succeeding the last highlighted character.

Returning to FIG. 1, beginning point capture module 110 extracts one or more features regarding the beginning of the portion to which the annotation corresponds. Any of a wide variety of features regarding the beginning point of the portion can be extracted. One example of such a feature is the actual characters of the content at the beginning point (e.g., one or more characters immediately preceding and/or succeeding the beginning point). In one implementation, the fifteen characters before the beginning point and the fifteen characters after the beginning point are captured as the features of the beginning point. Another example of such a feature is a hash value of the characters at the beginning point (e.g., a hash value generated by using a conventional hashing function (such as MD5 (Message Digest 5), SH-1 (Secure Hash Algorithm-1), or other cryptographic or non-cryptographic hash functions) to hash one or more characters immediately preceding or succeeding the beginning point). Yet another example of such a feature is an offset of the beginning point relative to another point (e.g., relative to the beginning or ending of the entire document, the beginning or ending of a particular section of the document, etc.). Such an offset can be calculated in different manners, such as a number of characters, a number of words, a number of paragraphs, a number of pixels, a particular length (e.g., number of inches) on a printed copy of the document, and so on.

Another example of such a feature is punctuation at or near (e.g., within a particular number of characters of) the beginning point. Still another example of such a feature is one or more keywords or proper nouns at or near (e.g., within a particular number of characters of) the beginning point. Yet another example of such a feature is dependent on the implemented document structure (e.g., the position of the beginning point in a HyperText Markup Language (HTML), Portable Document Format (PDF), or Rich Text Format (RTF) parse tree).

Ending point capture module 112 extracts one or more features regarding the ending of the portion to which the annotation corresponds. Analogous to beginning point capture module 110, any of a wide variety of features regarding the ending point of the portion can be extracted. In one implementation, the fifteen characters before the ending point and the fifteen characters after the ending point are captured as the features of the ending point. Ending point capture module 112 may extract the same types of features as beginning point capture module 110 (e.g., both may capture actual characters), or different types of features (e.g., module 110 may capture actual characters and an offset, while module 112 may capture a hash value of the characters and an offset).

Region capture module 114 extracts one or more features regarding the portion to which the annotation corresponds (that is, the region between the beginning and ending points). Various different features can be extracted by module 114. One such feature is the length of the portion. This length can be expressed in different manners, such as a character or word count, a pixel count, a length of the portion (e.g., in inches) when printed, etc.

Figure 3:
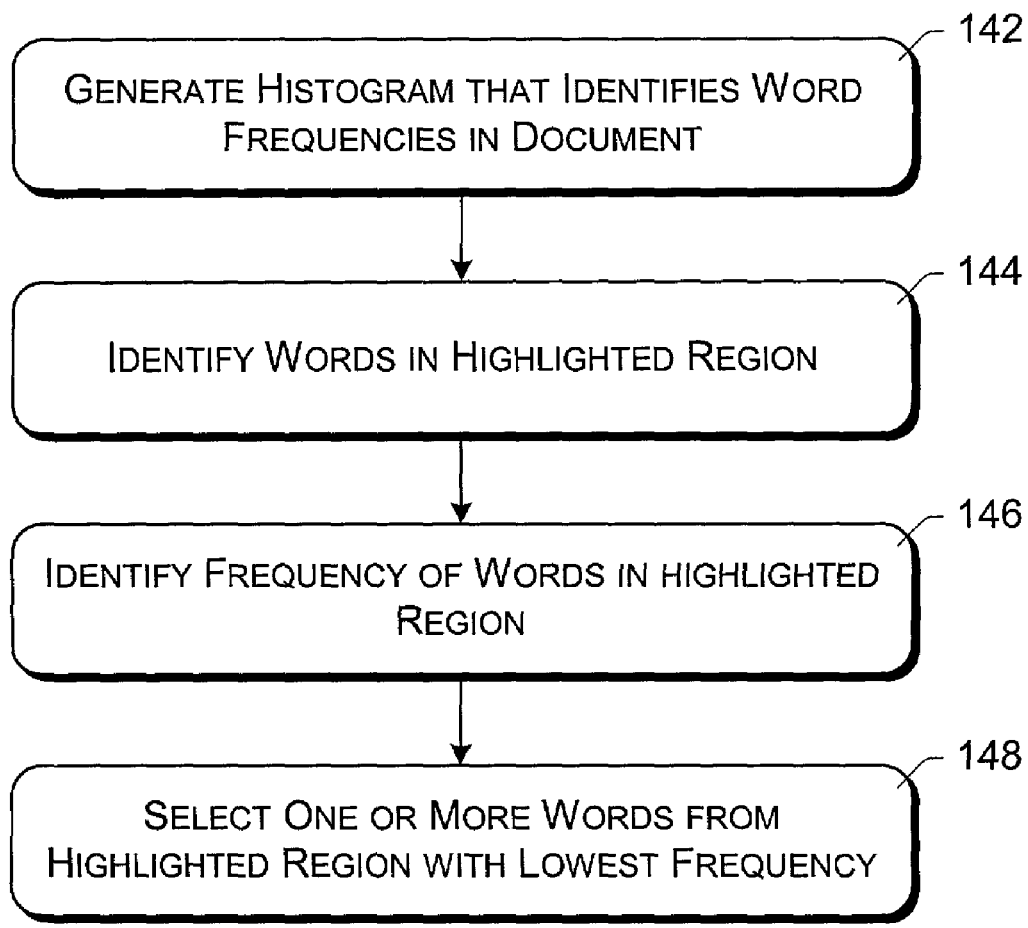
FIG. 3 illustrates an exemplary process carried out to generate a set of one or more keywords that exist within a region.

Another feature that can be extracted by module 114 is a set of one or more keywords that exist within the region. FIG. 3 illustrates an exemplary process 140 carried out by module 114 to generate a set of one or more keywords that exist within the region. Process 140 may optionally be implemented in software, firmware, hardware, or a combination thereof. Initially, a histogram that identifies word frequencies in the document is generated (act 142). It is to be appreciated that the histogram is generated in act 142 need only be generated once for each document (and not every time an anchor is created). The histogram generated in act 142 identifies, for each word in the document, the frequency of that word (i.e., the number of times the word appears in the document). This generation in act 142 is over the entire document, not just the highlighted region. The words that appear in the highlighted region are then identified (act 144). The frequency of the words in the highlighted region are then identified from the histogram (act 146). The frequency identified for each word in act 146 is the frequency of that word across the whole document, not just the frequency within the highlighted region.

Once the frequencies are identified, one or more words having the lowest frequencies are selected from the highlighted region (act 148). The number of words selected can vary, and in one implementation is dependent on the length of the region (e.g., the number of selected words may be a particular percentage of the number of words in the region). In one implementation, at least three keywords are selected. Alternatively, a particular number of words may not be selected, rather the words selected are those one or more words that have the lowest frequency (and all of the words with the lowest frequency are selected, regardless of how many there are). For example, one region of fifteen words may have three words that all have the lowest frequency (e.g., appearing five times each in the document while all others appear six or more times each), while another region of fifteen words may have only one word with the lowest frequency (e.g., appearing three times in the document while all others appear four or more times each). In the first instance, all three words would be selected as keywords, while in the second instance only the one word would be selected as a keyword.

Returning to FIG. 1, additional features that may be extracted from the highlighted region are the distance between the beginning point of the region and each keyword, as well as the distance between each keyword and the ending point of the region. These distances can be measured in a variety of different manners, such as characters, words, pixel counts, inches (e.g., on the document when printed), etc. Given these distances from each keyword to beginning and ending points, the distances between keywords can be readily generated and used during re-anchoring, as discussed in more detail below.

Various other features may also be extracted for the highlighted region, such as punctuation marks within the region (e.g., whether the beginning or ending points are located at particular punctuation marks, such as commas, periods, or quotes), sentence boundaries within the region (e.g., whether the beginning point is the beginning of a sentence, or whether the ending point is the ending of a sentence), proper nouns within the region, the grammatical structure of the region (e.g., subject/object position information, types of clauses within the region, etc.), an implementation-dependent document structure (e.g., an HTML, PDF, or RTF parse tree of the region), "fingerprinting" of the document (e.g., generate hashes of the entire document in short segments, then attach annotations to this "hash topography" of the document), the semantic "meaning" of the highlighted region (e.g., using Natural Language Processing techniques to analyze and store information about the "meaning" of what was selected in the region, and so forth.

Once annotation marking engine 102 has captured the various features for the beginning point, ending point, and region in-between these points, the captured features are output as an annotation anchor 152. The annotation anchor thus describes various features or aspects of the portion of content 108 to which the annotation corresponds. Given the information in the annotation anchor 152, the anchor 152 can be easily stored separately from the underlying content. Alternatively, if desired, the anchor 152 could be stored with the underlying content 108 or with the annotation content.

The following data structures illustrate one exemplary way in which captured data for annotation anchors can be stored. It is to be appreciated that these are exemplary only, and that alternative structures may also be used.

```
typedef struct_sRAnnPosInfo {
   sRPointInfo front; //beginning point
   sRPointInfo back; //ending point
   KEYWORDLIST keywords; //list of_sRKeywordInfo structures
   int length; //length of the annotation region
   _bstr_t bkmark; //alternate bookmark for faster re-anchoring
                   //if underlying content did not change
   long offset; //offset from the beginning of document to beginning
                //of annotation region
} sRAnnPosInfo;
typedef struct_sRPointInfo{
   _bstr_t leftContent; //the 15 characters before the point
   _bstr_t rightContent; //the 15 characters after the point
} sRPointInfo;
typedef struct_sRKeywordInfo{
   _bstr_t keyword; //the keyword
   int distToStart; //distance from start of keyword to start of annotation
   int distToEnd; //distance from start of keyword to end of annotation
} sRKeywordInfo;
```

Figure 4:
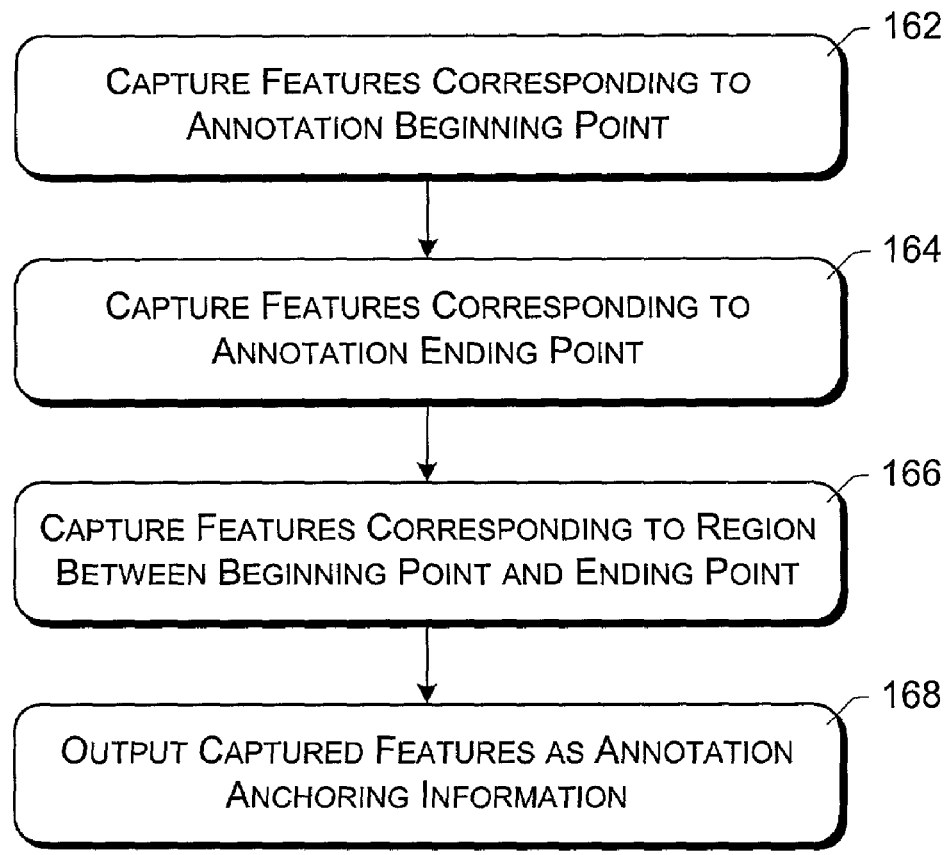
FIG. 4 is a flowchart illustrating an exemplary process for generating an annotation anchor.

FIG. 4 is a flowchart illustrating an exemplary process for generating an annotation anchor. The process 160 of FIG. 4 is carried out by annotation marking engine 102 of FIG. 1, and may be implemented in software, firmware, hardware, or a combination thereof.

Initially, features corresponding to the beginning point of the annotation are captured (act 162), and features corresponding to the ending point of the annotation are captured (act 164). Features corresponding to the region between the beginning point and ending point are also captured (act 166). These captured features are then output as the annotation anchor for the annotation (act 168).

Returning to FIG. 1, content 108 can also be input to a content editor 154. Content editor 154 represents any device or module capable of altering content 108. For example, content editor 154 may be a word processing application. The content 108 may be altered by editor 154 prior to, subsequent to, or concurrently with the marking of annotations performed by engine 102. The altered or modified content 156 is output by editor 154 and made available to annotation re-anchoring engine 104. Additionally, the annotation anchors 152 from annotation marking engine 102 are also made available to annotation re-anchoring engine 104. Re-anchoring engine 104 uses annotation anchors 152, as well as modified content 156, to re-anchor the annotations to modified content 156, outputting re-anchored annotations 158. Although discussed herein primarily with reference to re-anchoring annotations to modified content, it should be noted that annotations can be re-anchored to unmodified content as well (or re-anchored to content that has been stored in a different format).

An example of the altering of the underlying content as well as the re-anchoring of annotations to the altered content is illustrated in FIG. 2. The display 180 illustrates a sentence that is a modified version of the sentence illustrated in display 120. The original annotation is anchored to the highlighted portion 122 in display 120. However, since the sentence has been altered, the exact highlighted portion 122 (the phrase "hardwired into your brain") does not exist on display 180. Thus, annotation re-anchoring engine 104 of FIG. 1 re-anchors the annotation to the highlighted portion 182. Thus, even though the wording of the underlying content has been changed, the annotation is still anchored to the portion of the content that reflects (or closely reflects) the same idea as was originally annotated given the content in display 120.

Annotation re-anchoring engine 104 includes a candidate region determination module 186, a score comparator module 188, a user interface (UI) module 190, and a preferences module 192. For each annotation to content 108, candidate region determination module 186 attempts to generate a score (based on the annotation anchor for that annotation) for one or more regions of modified content 156 to which the annotation may potentially correspond. The score for a candidate region reflects how well the candidate region matches the region in the original content to which the annotation corresponds. Score comparator module 188 analyzes the various scores generated by candidate region determination module 186 and attempts to identify one of those candidate regions, based on the scores, to anchor the annotation to. Depending on the various scores, situations may arise where the user is prompted for input regarding where a particular annotation should be anchored. In these situations, UI module 190 allows the user to enter such input. Additionally, the behavior of one or more of modules 186, 188, and 190 may be user-configurable, in which case the user-configured options are stored as preferences 192. The behavior of annotation re-anchoring engine 104 is described in additional detail with reference to the following figures.

Figure 5:
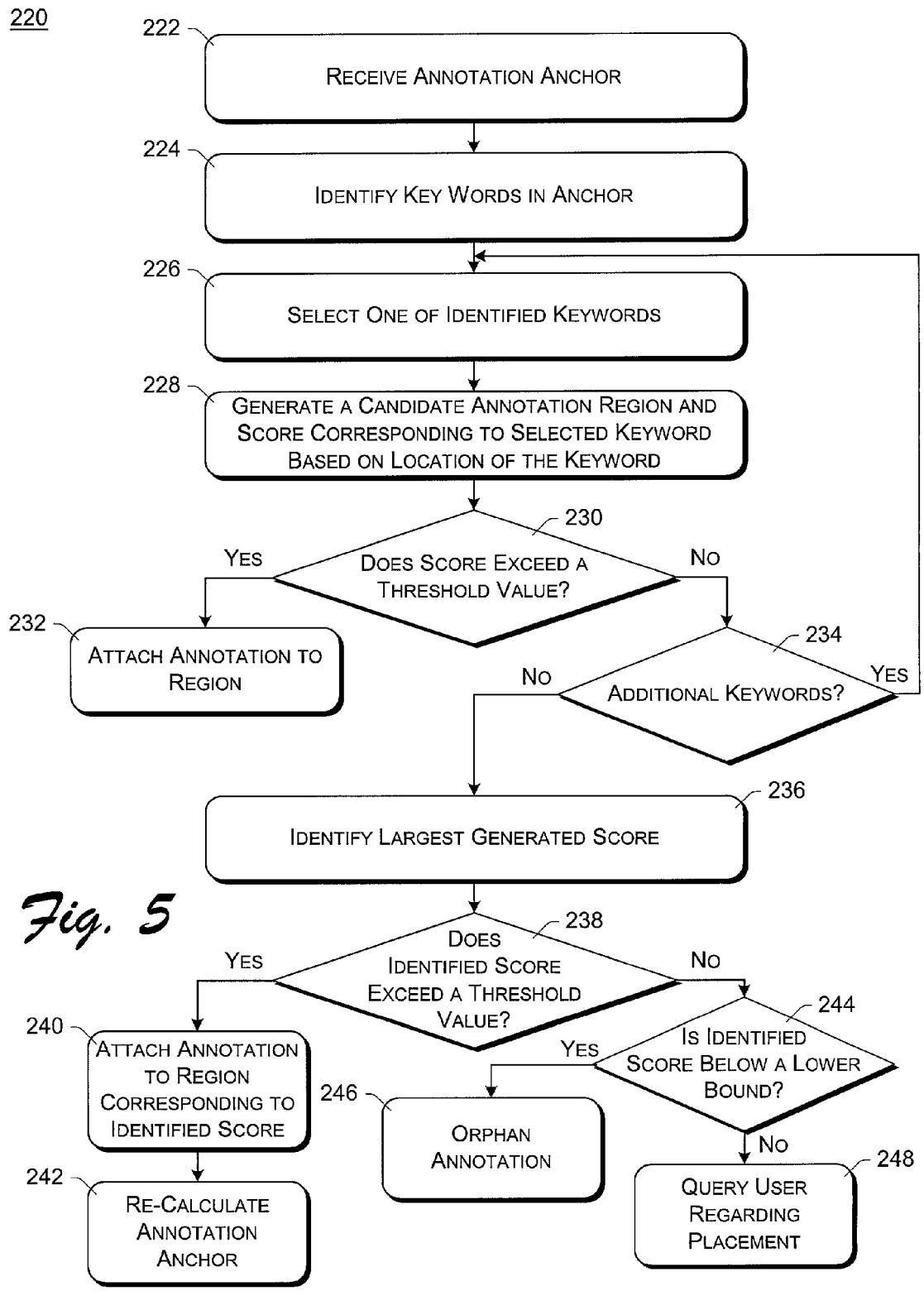
FIG. 5 is a flowchart illustrating an exemplary process for re-anchoring an annotation to modified content.

FIG. 5 is a flowchart illustrating an exemplary process for re-anchoring an annotation to modified content. The process of FIG. 5 is carried out by annotation re-anchoring engine 104 of FIG. 1 and may be implemented in software, firmware, hardware, or a combination thereof.

Initially, an annotation anchor is received (act 222). The keywords from the annotation anchor are identified (act 224), and one of the keywords is selected (act 226). Any one of the keywords can be selected in act 226 (e.g., the first one from a list stored in the annotation anchor, one selected at random, etc.). A candidate annotation region and score corresponding to the selected keyword are then generated based on the location of the keyword (act 228). If the selected keyword appears multiple times within the modified content, then a candidate annotation region and score is generated in act 228 for each of these multiple occurrences of the keyword. This generation in act 228 is performed based on the relationship of the keyword to any other keywords in the annotation anchor as well as the beginning and ending point information in the annotation anchor. An exemplary process for implementing act 228 is discussed in more detail below with reference to FIGS. 6a-6c.

A check is then made as to whether the generated score exceeds a threshold value (act 230). If the score does exceed the threshold value then the candidate region is determined to be the region that the annotation is to be anchored to, and the annotation is attached to that region (act 232). Attaching the annotation to the region refers to replacing the previous indication of the portion of the content that the annotation previously corresponded to with an indication of the new region. Thus, when the modified content is subsequently displayed, the new region is highlighted for the annotation. The specific manner in which the annotation is attached to the region will vary by implementation, and will typically use the same format as was used to indicate the initial region to engine 102. The threshold value used in act 230 can vary, but should be designed to be high enough that determination of the correct region can be confidently made without analysis of any additional candidate regions. For example, the threshold value may be 98 on a scale from 0 to 100.

If the score does not exceed the threshold value in act 230, then a check is made as to whether there are any additional keywords that have not yet been selected (act 234). If there are any such additional keywords than the process returns to act 226 to select one of the remaining keywords. However, if there are no additional keywords, then the process proceeds to identify the largest score of those generated in act 228 (act 236). A check is then made as to whether the largest score exceeds another threshold value (act 238), referred to as the "guess threshold". The guess threshold value is lower than the threshold value in act 230, but should be designed such that there is a high level of confidence in the determination that the candidate region is the correct region if the candidate region's score is above the guess threshold, and such that there is a low level of confidence in the determination that the candidate region is the correct region if the candidate region's score is below the guess threshold. For example, the threshold value in act 238 may be 70 or 80 on a scale from 0 to 100.

If the identified score exceeds the threshold value in act 238, then the candidate region corresponding to the identified score is determined to be the region that the annotation is to be anchored to, and the annotation is attached to that region (act 240). Additionally, the information in the annotation anchor is re-captured based on the new region the annotation is attached to (act 242). This re-calculation comprises an annotation marking engine (e.g., engine 102 of FIG. 1) re-capturing the various beginning point, ending point, and region features based on the new region that the annotation corresponds to. The history of the annotation anchoring may also be saved with the annotation anchor or alternatively elsewhere, allowing subsequent reference back to the preceding one or more annotation anchors if desired. Although not illustrated in FIG. 5, the annotation anchor may also be re-captured after attaching the anchor to the region in act 232.

Returning to act 238, if the identified score does not exceed the threshold value, then a check is made as to whether the identified score is less than a lower bound (act 244), referred to as the "orphaning threshold". This lower bound should be designed to be less than the threshold value in act 238, and low enough that there is little confidence in the determination that the candidate region is the correct region. For example, the lower bound in act 244 may be 30 or 40 on a scale from 0 to 100. If the identified score is below the lower bound, then the annotation is orphaned (act 246). Orphaning the annotation means that the annotation is not attached to any particular region of the content (all orphaned annotations may be displayed, for example, at the end of the content). However, if the identified score is greater than the lower bound, then the user is queried regarding placement of the annotation (act 248). In this situation, the candidate region's score is greater than the orphaning threshold but less than the guess threshold (there is sufficient information regarding the candidate region to position the annotation in the document, but not enough confidence to be sure it belongs there). For example, UI module 190 of FIG. 1 may display to the user an indication that the annotation is orphaned and also a "guess" button that the user can press to cause annotation to be anchored to the highest-scoring candidate region. Alternatively, UI module 190 may display to the user an identification of the annotation and the candidate region, and allow the user to input whether the region is the correct region to which the annotation should be attached. The user may thus identify which region is the correct region for the annotation, or alternatively indicate that the annotation should be orphaned.

The different threshold values discussed in acts 230 and 238, as well as the lower bound discussed in act 244, may be user-configurable parameters (e.g., stored as preferences 192 of FIG. 1). When these values are user-configurable parameters, UI module 190 presents an interface to the user allowing the user to enter inputs as to what one or more of these different values should be. The input by the user may be specific values (e.g., the user may enter "80" to indicate that a particular threshold amount should have a value of 80), or alternatively the inputs may be implicit. For example, UI 190 may present to the user an interface querying the user as to whether the anchoring of a particular annotation was correct. The results of one or more of such queries may then be used by engine 104 to learn more appropriate threshold or lower bound values. One specific example is if engine 104 automatically anchors multiple annotations because they have a score exceeding the threshold value (e.g., 80) in act 238, but the user indicates that many of those annotations are anchored incorrectly, engine 104 may increase the threshold value in act 238 to (e.g., to 84) in an attempt to decrease the number of annotations that are incorrectly anchored.

Alternatively, acts 230 and 232 may optionally be bypassed in process 220. Acts 230 and 232 operate as a shortcut to avoid processing numerous keywords and regions of a document if a candidate region is found that is almost certainly the right one (e.g., due to its very high score). Thus, acts 230 and 232 may be removed from process 220 (although, under certain situations, this removal may result in increased processing time to re-anchor an annotation).

Various other modifications may also be made to the process of FIG. 5. The process of FIG. 5 is a robust process that can correctly identify the correct region to which an annotation should be anchored even though the content of that region has been changed. While the process of FIG. 5 also accurately identifies the correct region to which an annotation should be anchored if the content of that region has not changed, other methods may be able to anchor annotations to unchanged content more quickly. Thus, in an alternative embodiment, the annotation anchoring described herein is modified to take advantage of the faster performance of other algorithms to identify unchanged regions to which annotations are to be anchored. In one implementation, a "getBookmark" method used by the Microsoft Internet Explorer 5.5® web browser is used to identify unchanged regions to which annotations are to be anchored. Additional information regarding the "getBookmark" method is available from Microsoft Corporation of Redmond, Wash.

Figure 6A:
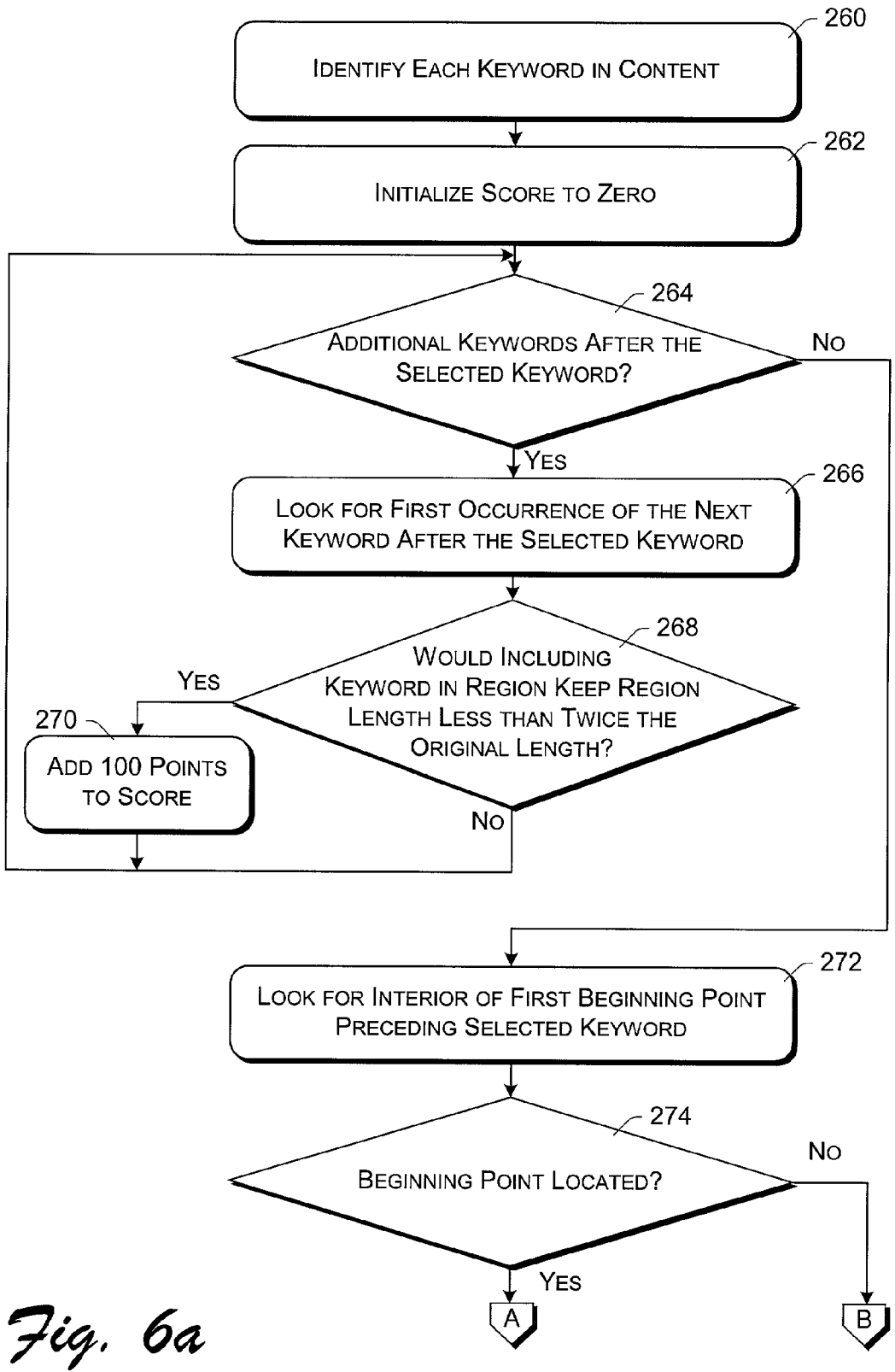
FIGS. 6a, 6b, and 6c are flowcharts illustrating an exemplary process for generating a candidate annotation region and score corresponding to a selected keyword.
Figure 6B:
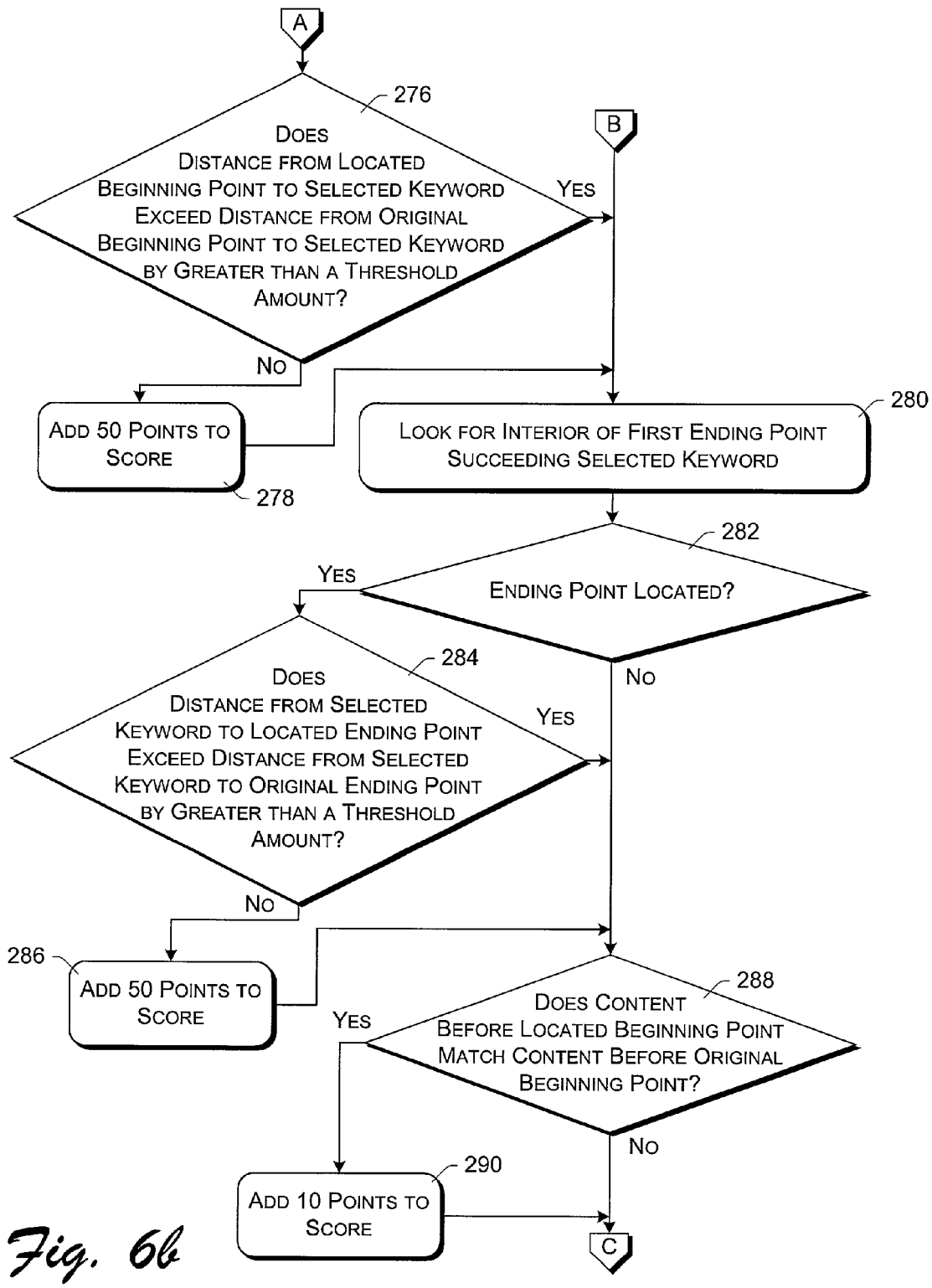
Figure 6C:
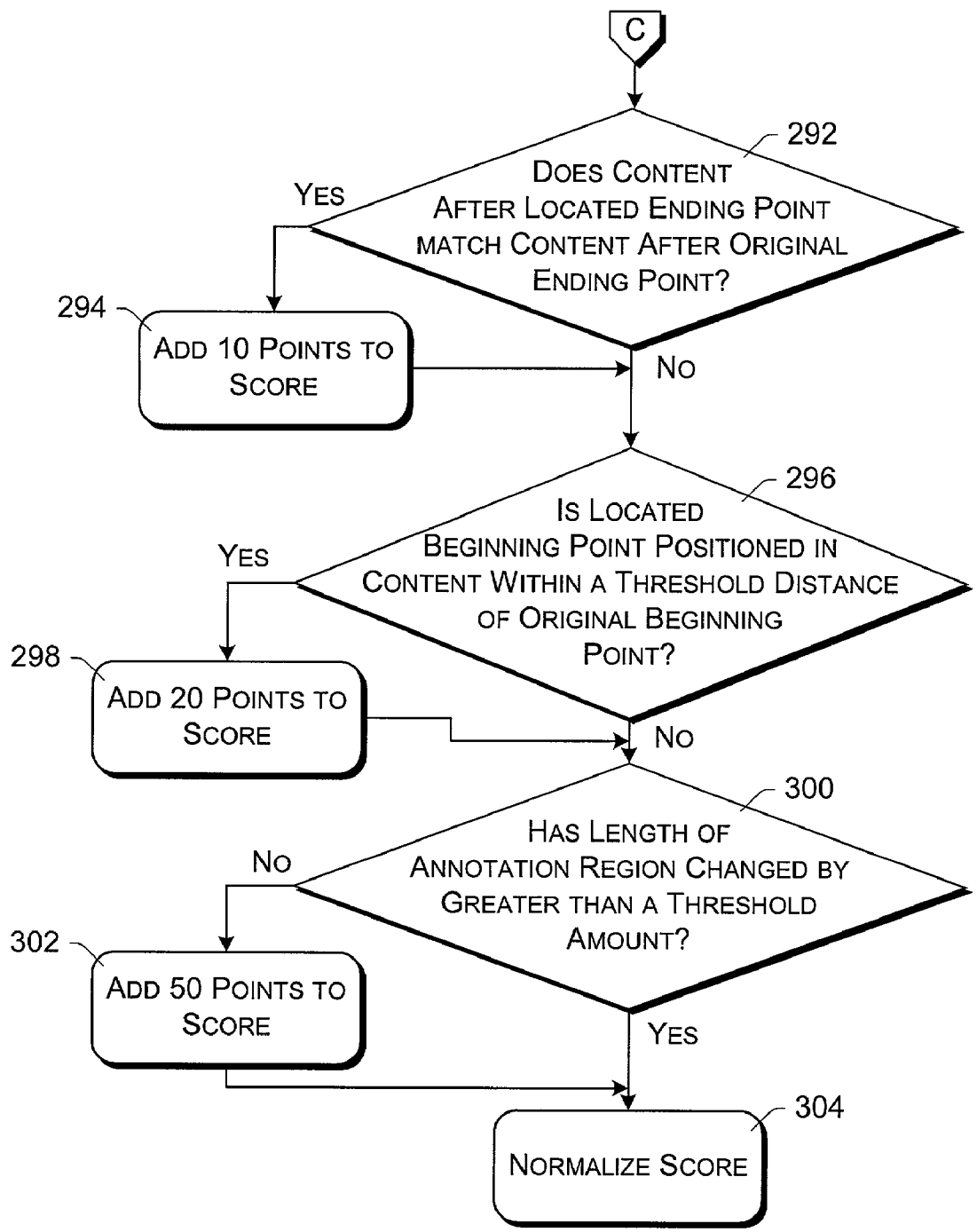

FIGS. 6a-6c are flowcharts illustrating an exemplary process 228 for generating a candidate annotation region and score corresponding to a selected keyword. The process 228 of FIGS. 6a-6c is carried out by annotation re-anchoring engine 104 of FIG. 1, and may be performed in software, firmware, hardware, or a combination thereof.

Initially, given the region information from the annotation anchor, multiple keywords in the modified content are identified (act 260). These keywords may be identified each time process 228 is performed, or alternatively only once per annotation anchor.

The score for the selected keyword is initialized to zero (act 262) and a check is made as to whether there are any additional keywords in the original annotation region after the selected keyword (act 264). The distance information stored in the annotation anchor (e.g., distances between beginning point and keywords and/or keywords and ending point) allows engine 104 to determine the order of keywords in the annotation region. Thus, the next keyword in the original annotation region (if any) can be readily identified. If there is at least one additional keyword after the selected keyword, a search is made through the identified keywords in the modified content for the first occurrence of the keyword after the selected keyword (act 266). A check is then made as to whether including the first occurrence of the next keyword in the candidate region would keep the length of the candidate region less than twice the length of the original region (act 268). If so, then 100 points are added to the score (act 270), the candidate region is extended to include that keyword, and processing returns to act 264. However, if including the first occurrence of the next keyword in the candidate region would not keep the length of the candidate region less than twice the length of the original region, then processing returns to act 264 without adding any value to the score and without extending the candidate region to include that keyword.

The process continues to check whether there are any additional keywords in the original annotation region after the selected keyword, and adds points to the score for those keywords, until all of the additional keywords have been analyzed (acts 264-270). In other words, if the anchor information includes a list of n keywords, process 228 looks at all n−1 other keywords for each of the keywords identified in act 260. This accounts for the possibility that the keywords get reordered in the modified content. For instance, suppose keywords A, B, and C are identified in the anchor. The process looks for all occurrences of A in the document (act 260). For each occurrence, the process looks for occurrences of B and C that follow it in the content. If the process fails to find a candidate region with a high enough score, the process looks for all occurrences of keyword B in the document. For each occurrence, the process looks for occurrences of A and C that follow it in the content, and so on.

After all of the additional keywords (if any) have been analyzed, the process looks for the first beginning point (e.g., point 184 of FIG. 2) preceding the selected keyword, based on the interior of the beginning point (act 272). The interior of the beginning point refers to the area between the beginning point and the selected keyword. The search in act 272 begins at the selected keyword and works its way towards the beginning of the content, analyzing each possible point along the way. The features from the annotation anchor are compared to each possible point and a determination made as to whether a match exists. In one implementation, a "match" exists when the features from the annotation anchor are the same as (identical to) the features at the point being analyzed. For example, the 15 characters preceding the point being analyzed are the same as the 15 characters preceding the beginning point (and stored as a feature in the annotation anchor). Alternatively, a "match" may exist when there is only a partial match (e.g., a partial substring match). Any of a variety of conventional processes may be used to determine a partial substring match, such as AGREP (additional information regarding AGREP is available from the University of Arizona, Department of Computer Science, Tucson, Ariz.).

Additionally, it should be noted that, analogous to the discussion above regarding extracting features for a "point", the features that distinguish a "point" need not be literal character strings. Rather, such features could be a "fingerprint"; a weighted collection of keywords, proper nouns, and punctuation; a character offset; etc.

Processing then proceeds based on whether a beginning point is located in act 272 (act 274). If a beginning point is located, then a check is made as to whether the distance from the located beginning point to the selected keyword exceeds the distance from the original beginning point to the selected keyword (as indicated in the annotation anchor) by greater than a threshold amount (e.g., greater than twice the original distance) (act 276). If the distance is not exceeded by greater than the threshold amount, then 50 points are added to the score (act 278), the candidate region is extended to include the located beginning point, and processing proceeds to look for the first ending point succeeding the selected keyword based on the interior of the selected keyword (act 280). If the distance is exceeded by greater than the threshold amount, then processing proceeds to act 280 without adding any points to the score and without extending the candidate region to include the located beginning point.

At act 280, the first ending point (e.g., point 185 of FIG. 2) is searched for analogous to the search for the first beginning point in act 274, except that the search proceeds from the selected keyword towards the end of the document. The interior of the ending point refers to the area between the ending point and the selected keyword. Analogous to the discussion above, a match may exist when the features at the point being analyzed are the same as or within a threshold amount of the features in the annotation anchor.

Processing then proceeds based on whether an ending point is located in act 280 (act 282). If an ending point is located, then a check is made as to whether the distance from the selected keyword to the located ending point exceeds the distance from the selected keyword to the original ending point (as indicated in the annotation anchor) by greater than a threshold amount (e.g., greater than twice the original distance) (act 284). If the distance is not exceeded by greater than the threshold amount, then 50 points are added to the score (act 286), the candidate region is extended to include the located ending point, and processing proceeds to act 288. If the distance is exceeded by greater than the threshold amount, then processing proceeds to act 288 without adding any points to the score and without extending the candidate region to include the located ending point.

At act 288, a check is made as to whether the part of the modified content preceding the located beginning point (e.g., a set of characters, such as 15, that immediately precede the located beginning point) matches the part of the original content preceding the original beginning point (as indicated in the annotation anchor). Analogous to the discussion above, a match may exist when the features at the point being analyzed are the same as or within a threshold amount of the features in the annotation anchor. If the part of the modified content preceding the located beginning point matches the part of the original content preceding the original beginning point, then 10 points are added to the score (act 290). If the part of the modified content preceding the located beginning point does not match the part of the original content preceding the original beginning point, or if there is no located beginning point, then no points are added to the score.

Processing then proceeds with a check being made as to whether the part of the modified content succeeding the located ending point (e.g., a set of characters, such as 15, that immediately succeed the located ending point) matches the part of the original content succeeding the original ending point (as indicated in the annotation anchor) (act 292). Analogous to the discussion above, a match may exist when the features at the point being analyzed are the same as or within a threshold amount of the features in the annotation anchor. If the part of the modified content succeeding the located ending point matches the part of the original content succeeding the original ending point, then 10 points are added to the score (act 294). If the part of the modified content succeeding the located ending point does not match the part of the original content succeeding the original ending point, or if there is no located ending point, then no points are added to the score.

Processing then proceeds to check whether the located beginning point is positioned in the modified content within a threshold distance of the original beginning point (act 296). This threshold distance (e.g., 25% of the length of the document) is the difference in the offset of the original beginning point from a particular point (e.g., the beginning of the document), and the offset of the located beginning point from the particular point. If the located beginning point is positioned in the modified content within a threshold distance of the original beginning point, then 20 points are added to the score (act 298) and processing proceeds to act 300. However, if the located beginning point is not positioned in the modified content within a threshold distance of the original beginning point, then processing proceeds to act 300 without adding any points to the score. In one implementation, a number of points between zero and 20 are assigned based on how far the point has moved (its position in the original content compared to its position in the modified content), using a sliding scale scoring process as discussed in more detail below.

The addition of points in act 298 is performed to distinguish between an "acceptable" choice and a "really good" choice. For example, suppose that an annotation is attached to the word "the" in a document. The word "the" is repeated several times throughout the document, so several candidate regions are identified, all of which are more or less equally likely to be the correct candidate region. By storing the distance of the original beginning point from the beginning of the original document, this helps the process identify the correct occurrence of "the" and discount the other occurrences from being correct.

At act 300, a check is made as to whether the length of the annotation region (from located beginning point to located ending point) has changed by greater than a threshold amount (e.g., increased by more than twice the original length or decreased by more than one-half the original length). If the length has not changed by greater than the threshold amount, then 50 points are added to the score (act 302); otherwise, no points are added to the score. If no beginning point is located (in act 272) and/or no ending point is located (in act 280), then no points are added to the score. If no beginning point is located then a default beginning point is determined to be the beginning of the first keyword identified and included in the candidate region. Similarly, if no end point is located, then a default ending point is determined to be the end of the last keyword identified and included in the candidate region.

Processing then proceeds to act 304, where the score is normalized by the maximum possible score for the keyword (which will vary based on the number of keywords in the annotation region). In one implementation, the score is normalized to a scale of 0 to 100. The maximum possible score (MaxScore) for a candidate region is determined as follows:

$$\text{MaxScore} = (\text{keywordWeight} \times (\text{no. of keywords} - 1)) + (2 \times \text{endPointWeight}) + (2 \times \text{contextWeight}) + \text{offsetWeight} + \text{lengthWeight}$$

where keywordWeight is the number of points added for locating a keyword that keeps the range within the desired length (100 points in acts 270 and 278), no. of keywords is the number of keywords indicated in the anchor as being in the region, endPointWeight is the number of points added for locating each of the beginning point and the ending point within the desired distance (50 points each in acts 278 and 286), contextweight is the number of points added for the context of the located beginning point (the area preceding the beginning point) and the ending point (the area succeeding the ending point) matching the original context (10 points each in acts 290 and 294), offsetWeight is the number of points added for the located beginning point being positioned as desired (20 points in act 298), and length Weight is the number of points added for the length of the annotation region not changing more than the desired amount (50 points in act 302).

In the discussion above regarding FIGS. 6a-6c, reference is made to particular point values (e.g., in acts 270, 278, 286, 290, 294, 298, and 302). It is to be appreciated that these specific point values are exemplary only, and that different point values could be used.

Also in the discussion above regarding FIGS. 6a-6c, various checks are made and either a full number of points are added to the score or zero points are added to the score depending on the outcome of the check. Alternatively, rather than having either all or zero points awarded based on the outcome of a check, a sliding scale may be implemented that assigns different points ranging from zero up to all points based on how well the checked value compares to the original value. For example, in checks where distances are involved (e.g., the length of the annotation region, or offset of the beginning point from a particular point in the content), the actual score (Score) may be determined as follows:

$$\text{Score} = \text{weight} \times ((\text{maxDiff} - \text{diffAmt}^{1.2}) \div \text{maxDiff})$$

where weight is the maximum number of points that may be assigned, maxDiff is the maximum possible difference, and diffamt is the amount of difference between the two distances. The value diffAmt is raised to power 1.2 so that the score goes down by more as the amount of the difference gets larger. In one implementation, if the value of diffAmt$^{1.2}$ is greater than the value of maxDiff, then the value of Score is set to zero.

Various other modifications may also be made to the process of FIGS. 6a-6c. In one implementation, the surrounding context of an original beginning point and/or ending point can be used to assist in locating a beginning point and/or ending point in the modified content. For example, rather than relying solely on the interior of the beginning point in determining the location of a beginning point (in act 272), the exterior of the beginning point (the area immediately preceding the beginning point) may be used to compare against the area immediately preceding the original beginning point. If the comparison results in a match, then the beginning point may be located even if the interior of the beginning point is not a match. An analogous process may be used for the ending point, except that the exterior of the ending point refers to the area immediately succeeding the ending point. Note, however, that beginning and ending points located based on the surrounding context may be given a lower weight than a beginning and ending points located based on the interior.

Another modification that may be made is to expand anchors to a particular default point if the beginning point or ending point cannot be located. The particular point can vary based on the type of annotation made (e.g., implicit or explicit), and may be, for example, the beginning or ending of a sentence, the beginning or ending of a paragraph, the beginning or ending of a section, etc. By way of example, if an annotation is anchored to a portion of a sentence in the original content, but the ending point in the modified content cannot be located, then the end of the sentence that includes the last keyword (the last keyword that still keeps the candidate region within the desired length) may be used as the located ending point (although the number of points added in act 286 may be reduced to reflect the manner in which the ending point was located). By way of another example, if an annotation is anchored to a portion of a sentence in the original content, but the beginning point in the modified content cannot be located, then the beginning of the sentence that includes the selected keyword may be used as the located beginning point (although the number of points added in act 278 may be reduced to reflect the manner in which the beginning point was located).

Another modification that may be made is to expand what words are used as keywords. For example, proper names may be used as keywords, or capitalized words (other than those at the beginning of a sentence) may be used as keywords, or words in quotation marks may be used as keywords. Punctuation may also be used as a keyword. Certain punctuation marks may be pre-determined or user-selected as being keywords (e.g., exclamation points, question marks, quotation marks, etc.), or alternatively histograms of punctuation frequency may be generated analogous to those of word frequency discussed above. Additionally, the "keywords" may be limited to only letters, or may include both letters and numbers, and optionally include other characters (for example, the ampersand, section mark, etc.).

As discussed above with reference to FIG. 5, the user may be queried for input as to whether the proposed region for anchoring an annotation is correct. The proposed region may be identified to the user in any of a variety of manners, such as displaying to the user the actual content in the region, or highlighting the region in the modified content. This interface may allow the user to simply indicate "yes" or "no", or alternatively have the user manually select the region of the modified content to which the annotation should be anchored. Alternatively, the user may be allowed to cycle through multiple different proposed regions and select which of those regions is the correct region to which the annotation should be anchored.

Another modification that may be made is to expand on the semantics of the region, such as using a thesaurus to expand a particular keyword. For example, if the next keyword after the selected keyword is not found in act 266, or would be outside the desired range in act 268, then additional acts may be performed to lookup synonyms for the keyword in a thesaurus. These synonyms are then searched for and a determination made as to whether they are within the desired range (analogous to acts 266 and 268). If a synonym is within the desired range, then an appropriate number of points can be added to the score (analogous to act 270). The number of points may optionally be less than the number that would have been added if the original keyword were found rather than a synonym. Analogous to synonyms, antonyms may also be searched for (e.g., the word "yes" has been replaced by the word "no", or the word "beginning" has been replaced by the word "ending"), although the number of points added for finding an antonym would optionally be less than the number added for finding a synonym.

Another modification that may be made to attempt to identify possible split regions. A split region refers to the region the annotation is originally anchored to being split into two or more parts and additional content inserted between the parts. This can result in low scores for the different parts of the annotation because the remaining parts do not satisfy many of the distance tests that are performed (e.g., length of the entire region, distance from a keyword to the beginning point or ending point, etc.). In this situation, the various data and scores me can be analyzed to attempt to determine such a split. This analysis to identify a split region may always be performed, or alternatively only sometimes (e.g., if the annotation would otherwise be orphaned). In performing the analysis, annotation re-anchoring engine 104 looks for "pieces" of the annotation region, such as the beginning point followed by one or more keywords, and one or more other keywords followed by the ending point. If such pieces are located, engine 104 treats the entire split region (including the additional content inserted between the two pieces) as the annotation region.

Alternatively, each of the individual pieces may be treated as an individual annotation region (thus splitting the original annotation into two annotations). Intermediate points can be generated for split regions in much the same way that beginning and ending points are generated, except that the intermediate points are generated within the interior of the selected region around "significant" intermediate features, such as periods and commas (which are likely to serve as cleaving points where a whole sentence or phrase may be separated from the preceding or succeeding sentence or phrase). These intermediate points are generated when the beginning and ending point features are captured (e.g., by annotation marking engine 102 of FIG. 1), but can be left out of most processing by annotation re-anchoring engine 104 unless splitting is suspected. As intermediate points are found, they can serve as ending/beginning points for the new regions resulting from the split.

In addition, the discussion above refers to generating scores for different candidate regions with the highest score being indicative of the closest match to the original region the annotation was anchored to (and thus the best score). Alternatively, different scoring methods may be used so that the lowest score is the best score and indicative of the closest match (e.g., rather than adding points in acts 270, 278, 286, 290, 294, 298, and 302, points can be subtracted).

Various modifications can also be made to improve the efficiency of the processes described above. For example, as discussed with reference to act 142 of FIG. 3, the histogram need only be generated once per document. By way of another example, the indexing of keywords in the modified content (act 260 of FIG. 6*a*) need only be performed once for the content (and not repeated for each keyword in an annotation anchor). By way of another example, once a particular keyword is located in the modified content for re-anchoring one annotation, it need not be re-located when re-anchoring additional annotations.

Figure 7:
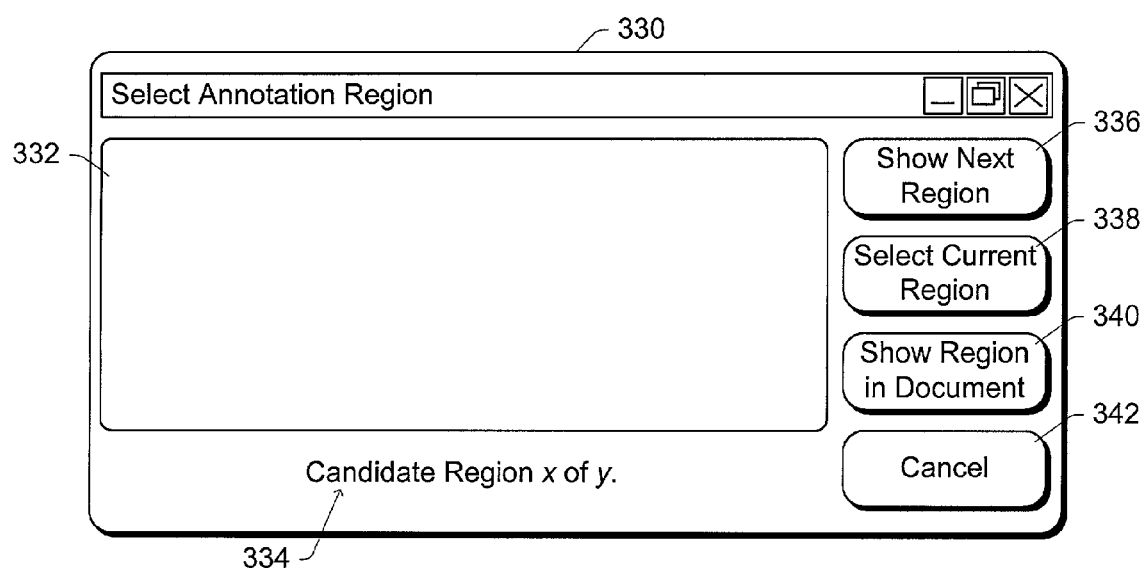
FIGS. 7, 8, 9, 10, 11, and 12 illustrate exemplary user interfaces that may be presented by a UI module.

FIG. 7 illustrates an exemplary user interface 330 that may be presented by module 190 of FIG. 1. The interface 330 includes an annotation display window 332 in which the content of the candidate region(s) can be displayed. Although illustrated as showing only one candidate region at a time, alternatively multiple regions may be displayed in window 332 concurrently. A region identification portion 334 identifies which candidate region is currently being displayed in window 332 as well as the total number of candidate regions. Multiple user-selectable buttons 336, 338, 340, and 342 are also included in interface 330. Show next region button 336 causes, upon selection, UI module 190 to display in window 332 the next candidate region. Regions can be ordered in any manner, such as from highest score to lowest score. Select current region button 338 causes, upon selection, UI module 190 to record the candidate region currently being displayed as the region to which the annotation is to be anchored. Show region in document 340 causes, upon selection, UI module 190 to display the underlying content and draw attention to (e.g., highlight) the candidate region within the underlying content. UI module 190 may display the underlying content in window 332, or alternatively open another user interface window for display of the content (or alternatively take some other action, such as print out the underlying content with the candidate region underlined). Cancel button 342 causes, upon selection, UI module 190 to close window 330 and terminate the querying process for the current annotation anchor. In one implementation, if the querying process is terminated without user selection of a candidate region, the annotation is orphaned.

Additional information (not shown) may also be optionally included in interface 330. For example, the score of the region currently being displayed in window 332 may also be displayed, the range of scores for the candidate regions may be displayed, an indication of important aspects that could not be located for the candidate region may be displayed (e.g., an indication that a beginning point or an ending point could not be found, or that a particular keyword could not be found), an indication of which keywords were found within the candidate region, and so forth. Interface 330 is intended to be exemplary only. The components of interface 330 can be changed to be any of a wide variety of conventional user interface components. For example, rather than buttons 336-342, one or more pull-down menus may be included that illustrate user-selectable inputs, one or more check boxes and an "ok" button may be used for the inputs, and so forth.

Additionally, UI module 190 may present an interface to the user that lets the user adjust the region of the modified content to which the annotation is re-anchored. For example, the re-anchoring process may identify a region of the modified content which the user believes is too long or too short at the beginning and/or ending. UI module 190 can present an interface that lets the user re-highlight the portion of the modified content to which he or she desires to have the annotation anchored. This can be done, for example, in window 332 of FIG. 7, or alternatively a separate window or dialog box. The user may be allowed to manually re-highlight the desired region, or alternatively may be allowed to input relocation commands to UI module 190 (e.g., enter a number into a data entry field and then click a button to "extend ending" by the entered number of characters or words, "shorten beginning" by the entered number of characters or words, etc.). Any such changes are then stored so that the annotation is attached to this re-highlighted portion.

Figure 8:
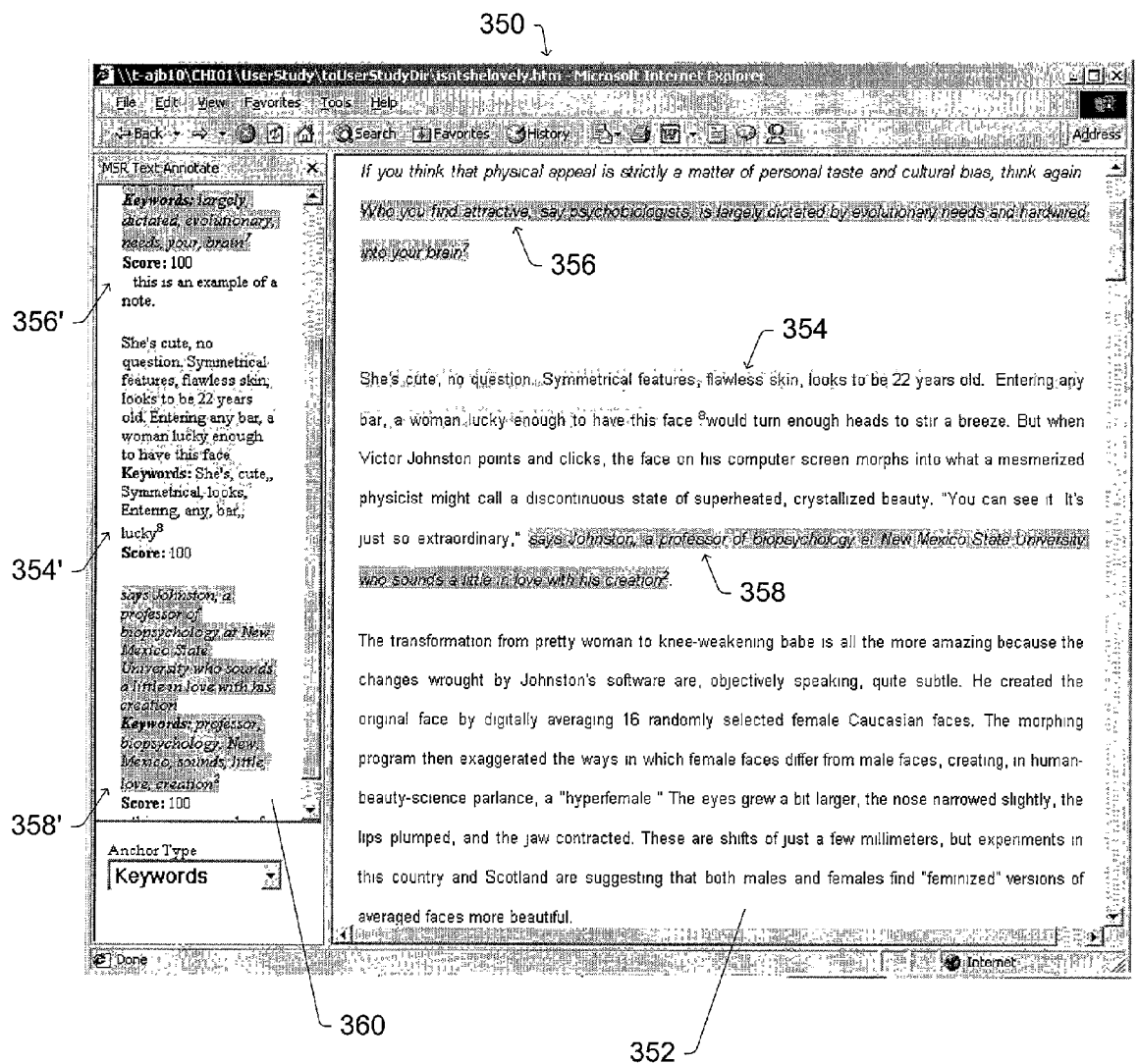

FIGS. 8-12 illustrate additional exemplary user interfaces that may be presented by UI module 190 of FIG. 1. FIG. 8 illustrates an interface 350 displaying a web page 352 (e.g., written using HTML or XML) with highlighted (shaded) annotations made on it. Highlighted region 354 is a "highlight" annotation with no additional content to it (e.g., nothing extra typed-in by the user as annotation content), while highlighted regions 356 and 358 are "note" annotations with some content. On the left hand side an annotation display portion 360 displays an index showing, among other things, the keywords that were chosen from the highlighted regions and their respective anchoring scores (all 100 because they were all created on this web page). The information (e.g., keywords and scores) 354', 356', and 358' in portion 360 correspond to regions 354, 356, and 358, respectively.

Figure 9:
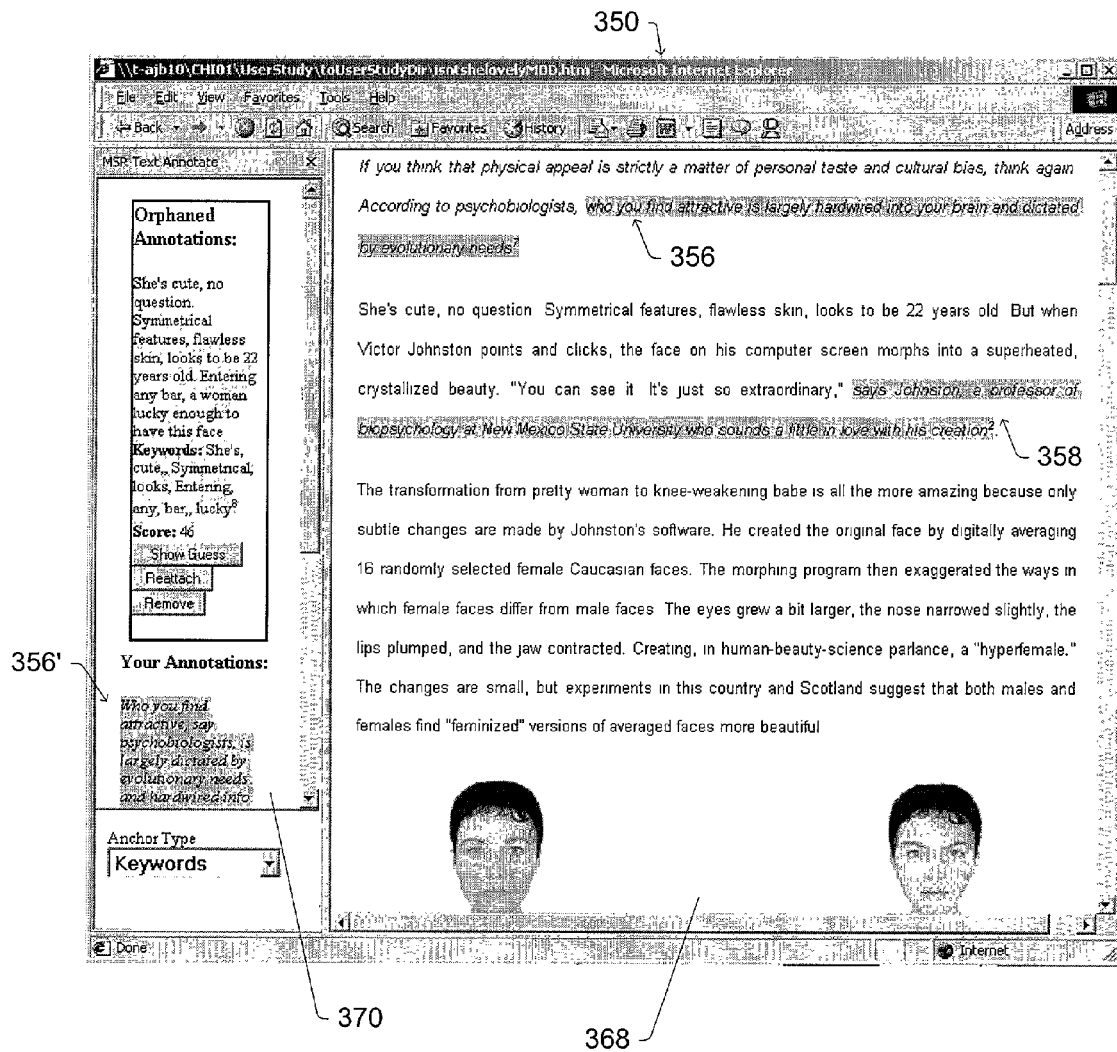

FIG. 9 illustrates interface 350 displaying a page 368 that is a modified version of the original web page 352 of FIG. 8. On page 368, the highlight annotation 354 has been orphaned, and this is indicated in annotation display portion 370 (its score is less than the higher guess threshold, but greater than the lower orphan threshold). The note annotations 356 and 358 have both been found and repositioned correctly, however note that the region that is highlighted for note annotation 356 in the modified document 368 is slightly different from the region that was highlighted for it in the original document 352.

Figure 10:
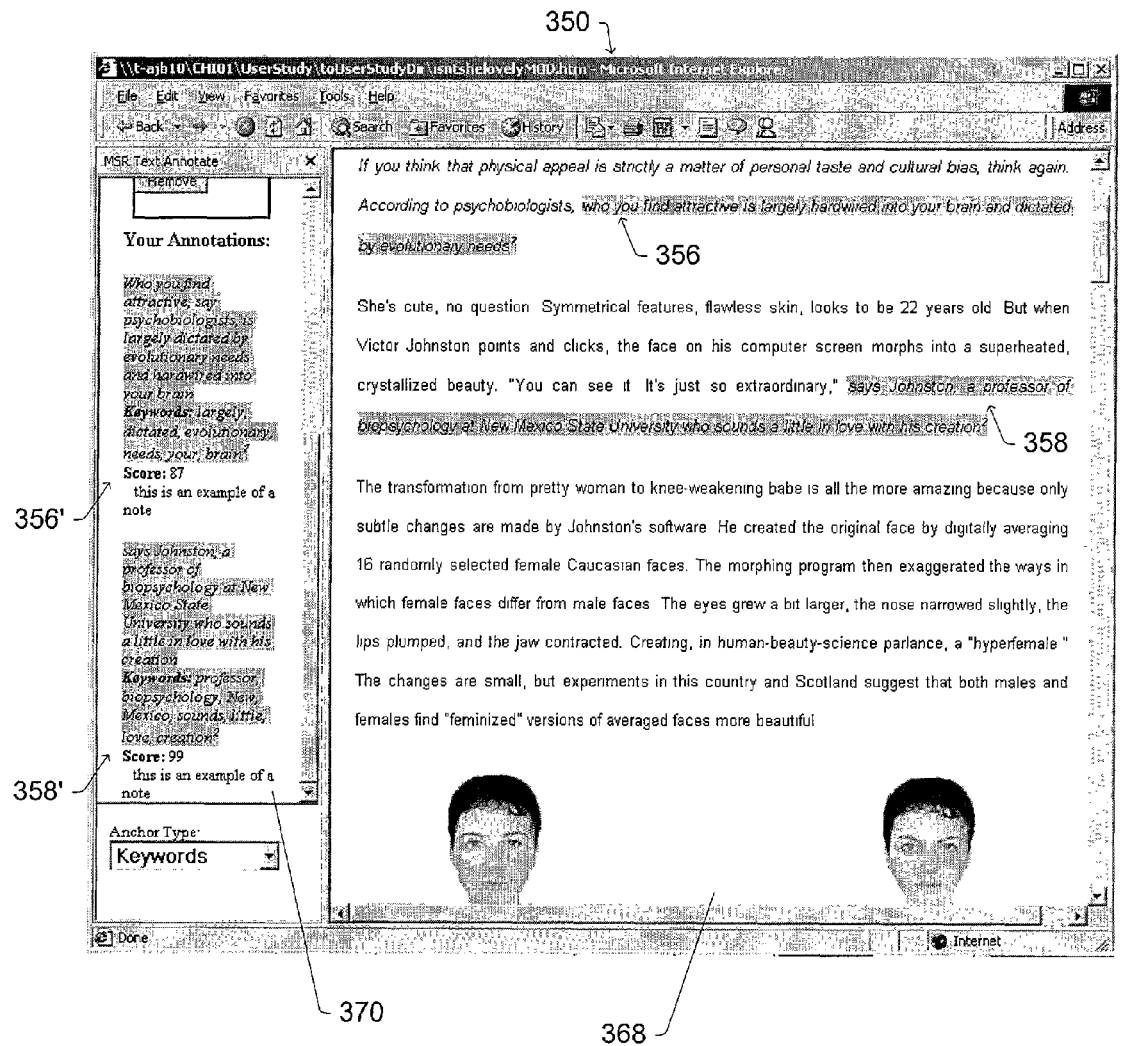

FIG. 10 illustrates interface 350 displaying page 368 and is the same as FIG. 9 except that the index pane (annotation display portion 370) on the left hand side has been scrolled to show the details for the two note annotations 356 and 358. Note annotation 356 has a less-than-perfect score due to the region with which it is associated being slightly different from the region it was originally anchored to. Note annotation 358 also has a score of less than 100 (due, for example, to changes in location of the region with which it is associated having shifted slightly due to alterations in the content of the modified version).

Figure 11:
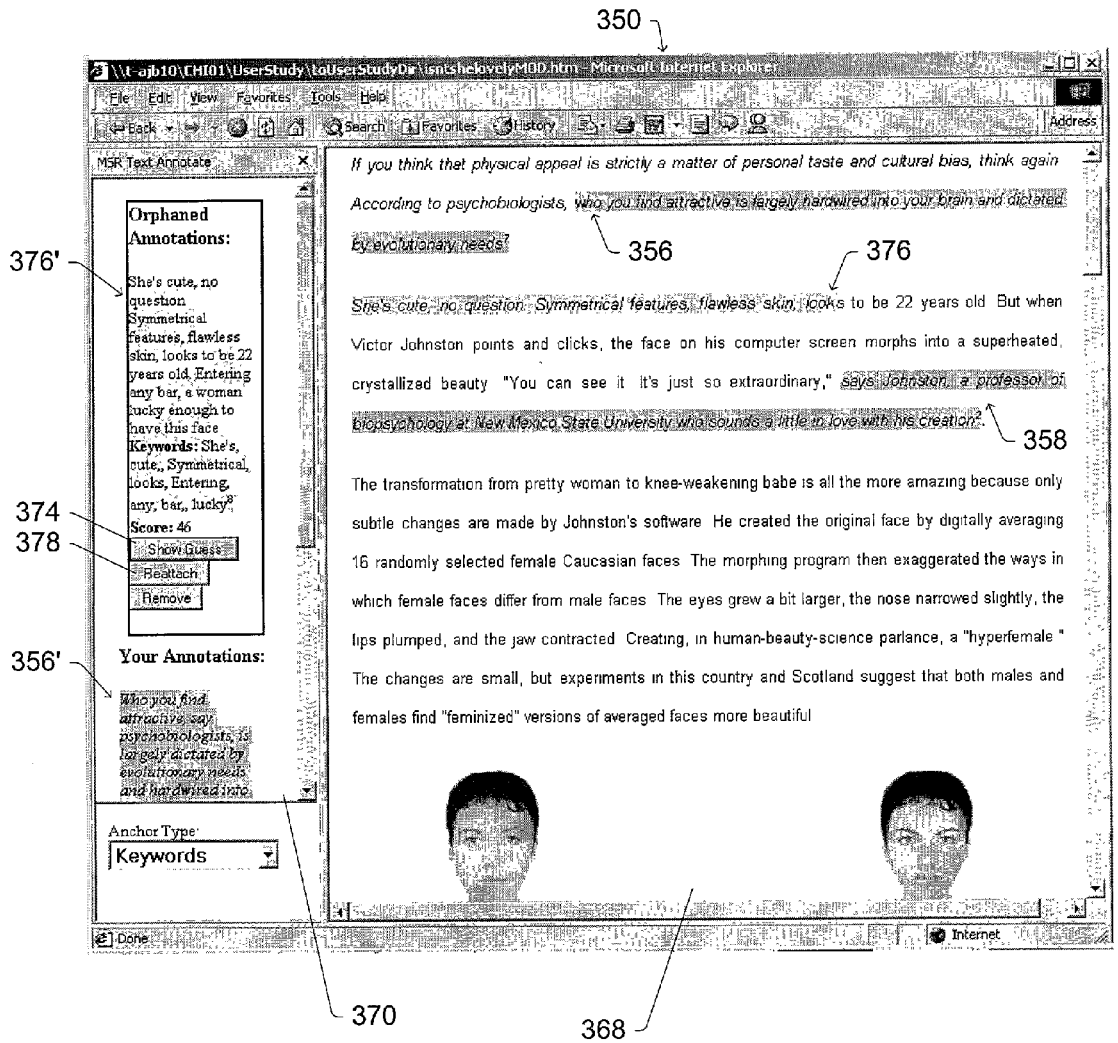

FIG. 11 illustrates interface 350 displaying page 368 and is similar to FIG. 9, but shows the modified web page 368 after the "guess" button 374 in portion 370 has been pressed for the orphaned annotation. The "best guess" candidate region 376 is displayed on page 368, indicating the candidate region that the process identified as being the most likely region to which the orphaned annotation corresponds. The information (e.g., keywords and score) 376' in portion 370 corresponds to region 376.

Figure 12:
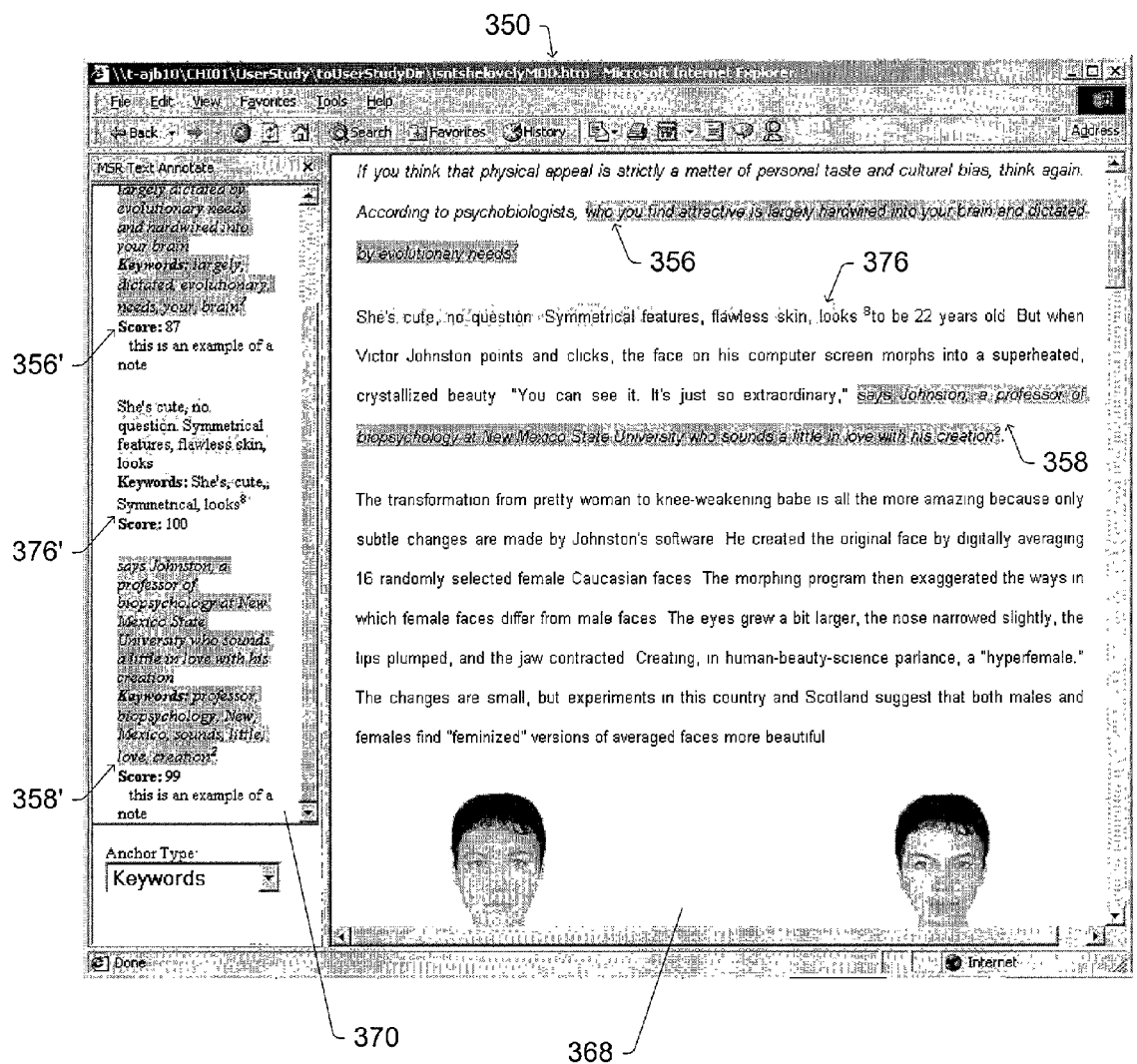

FIG. 12 illustrates interface 350 displaying page 368 and is similar to FIG. 11, but shows modified web page 368 after the "best guess" candidate region has been selected as the new location for the highlight annotation and the "reattach" button 378 of FIG. 11 has been pressed. The "reattach" button 378 causes the process to calculate new anchor statistics for the highlight annotation based on the newly selected region 376 and stores them with the annotation. The score for the previously orphaned annotation is now 100 as it is now treated as having been created on web page 368.

Figure 13:
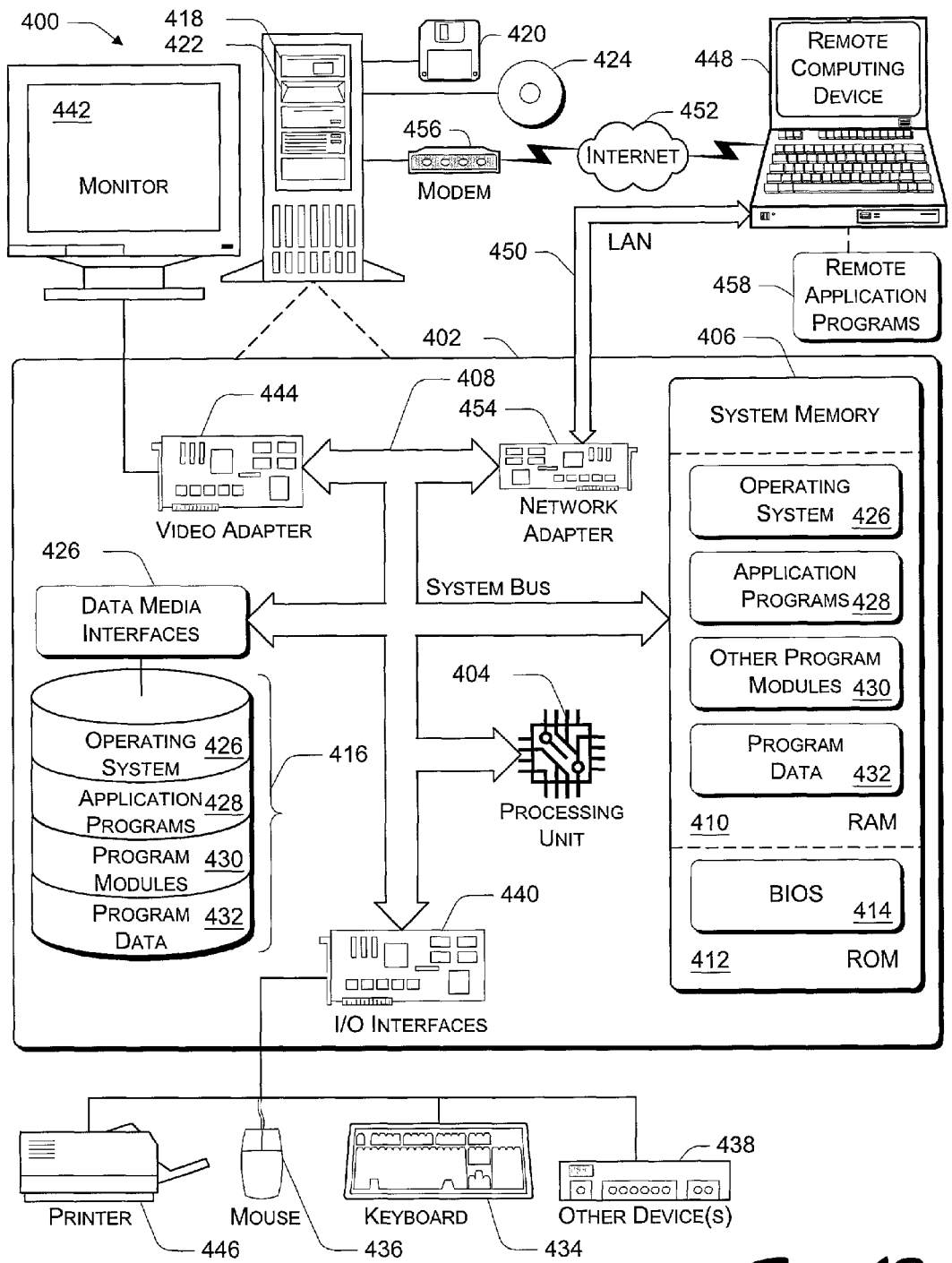
FIG. 13 illustrates a more general exemplary computer environment, which can be used to implement the improved meta data management described herein.

FIG. 13 illustrates a more general exemplary computer environment 400, which can be used to implement the improved meta data management described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a device implementing annotation marking engine 102, annotation re-anchoring module 104, or content editor 154 of FIG. 1. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 13 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disc drive 422 for reading from and/or writing to a removable, non-volatile optical disc 424 such as a CD-ROM, DVD-ROM, or other optical media. The hard disk drive 416, magnetic disk drive 418, and optical disc drive 422 are each connected to the system bus 408 by one or more data media interfaces 426. Alternatively, the hard disk drive 416, magnetic disk drive 418, and optical disc drive 422 can be connected to the system bus 408 by one or more interfaces (not shown).

The various drives and their associated computer-readable media provide non-volatile storage of computer readable instructions, data structures, program modules, and other data for computer 402. Although the example illustrates a hard disk 416, a removable magnetic disk 420, and a removable optical disc 424, it is to be appreciated that other types of computer readable media which can store data that is accessible by a computer, such as magnetic cassettes or other magnetic storage devices, flash memory cards, CD-ROM, digital versatile discs (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 416, magnetic disk 420, optical disc 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer 402 typically includes at least some form of computer readable media. Computer readable media can be any available media that can be accessed by computer 402. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other media which can be used to store the desired information and which can be accessed by computer 402. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

It should be noted that the annotation anchoring described herein captures features of the underlying content to which the annotation corresponds, and uses these captured features for re-anchoring the annotation to the content after it has been modified. The anchor information is independent of the underlying content—no changes or additions to the underlying content need be made in order to generate the annotation anchor (e.g., no tags or markers need be inserted into the underlying content to indicate where in the underlying content the annotation is to be anchored).

It should further be noted that the annotation anchoring described herein is not tied to any particular content format. For example, various different formats exist for storing content, such as the Microsoft Word word processing document format, the HTML format, the Tagged Image File Format (TIFF), RTF, PDF, etc. The annotation anchors are generated based on captured features from the original language-level content, and, depending on the features extracted, need involve no format-specific structural analysis of the document, so even if the content were to be modified and changed to a different format, the annotation could still be re-anchored to the new format.

The anchoring and re-anchoring described herein is discussed primarily with reference to text content. However, it is to be appreciated that the anchoring and re-anchoring can be used with a wide variety of types of content. With different types of content, different characteristics of the content may be used analogously to the keywords discussed above. These different key parts of the content will vary based on the content type (e.g., keywords for text content, shot boundaries for video content, etc.).

By way of example, the underlying content 108 of FIG. 1 could be video content with each frame of video content being treated as analogous to characters in text content. The beginning point of a region of video content may be identified by capturing the frame number of the first frame in the region, by capturing color histograms calculated from the first five frames preceding and succeeding the beginning point, etc. Similarly, the ending point of a region of video content may be identified by capturing the frame number of the last frame in the region, by capturing color histograms calculated from the first five frames preceding and succeeding the ending point, etc. For the region between the beginning and ending points, various features may be captured such as the number of frames between the two points, drastic changes in video may be identified using conventional shot boundary detection techniques and these shot boundaries used analogously to text keywords, etc. An example of such a shot boundary detection technique is discussed in Yong Rui, Thomas S. Huang, and Sharad Mehrotra, *Constructing Table-of-Content for Videos*, ACM Multimedia Systems Journal, Special Issue Multimedia Systems on Video Libraries, Vol.7, No.5, September 1999, pp 359-368.

By way of another example, the underlying content 108 of FIG. 1 could be a single image with each pixel in the image being treated as analogous to characters in text content. For image content, rather than a set of sequential bits being the region, a 2-dimensional shape (e.g., a rectangle, circle, triangle, etc.) may be used to define the annotation region. Points on the 2-dimensional shape can be treated analogously to the beginning and ending points (e.g., the top left corner of the rectangle may be the beginning point and the lower right corner of the rectangle may be the ending point), and actual pixel values, hashes of pixel values, pixel offsets (e.g., from a particular point, such as an origin), etc. may be calculated. Various features can be captured for the region, such as a color histogram, number of pixels in the region, recognizable/trackable objects in the region, motion flow, edge features, wavelet signatures, or various other standard image processing features. These features can then be used to re-anchor the annotation to the correct portion of the image (e.g., a particular individual's face in the image) despite changes in resolution of the image, cropping of the image, etc.

By way of yet another example, the underlying content 108 of FIG. 1 could be audio content. Audio content in digital form can be separated into multiple frames or samples (or groups of frames and samples), and various features captured therefrom to be used to anchor annotations to the audio content. In the case of analog audio content, the analog audio can be digitized into digital form in a conventional manner (which generates multiple samples). The beginning point of a region of audio content may be identified by capturing the frame or sample number of the first frame or sample in the region, by capturing the values of a number of frames or samples preceding and succeeding the beginning point (e.g., 50 ms of audio data preceding and succeeding the beginning point), by extracting any of various features commonly used in conventional speech or audio processing programs, such as Fast Fourier Transform (FFT) to generate frequency-domain features from the audio segment, or Mel Frequency Coefficients (MFCC), etc. Similarly, the ending point of a region of audio content may be identified by capturing the frame or sample number of the last frame or sample in the region, by capturing the values of a number of frames or samples preceding and succeeding the ending point (e.g., 50 ms of audio data preceding and succeeding the ending point), by extracting any of various features commonly used in conventional speech or audio processing programs, etc. For the region between the beginning and ending points, various features may be captured such as the number of frames or samples between the two points, drastic changes in audio characteristics (e.g., changes in volume) may be identified using conventional techniques and used analogously to text keywords, a signature corresponding to silence/pause intervals in the region may be generated, etc.

Additionally, the anchoring and re-anchoring described herein is discussed primarily with respect to explicit annotation region identification by a user (for example, the user highlighting or underling a particular series of words in text content). However, the anchoring and re-anchoring is also applicable to implicit region identification. For example, a user may make a mark in a margin next to a paragraph and enter an annotation associated with that mark. For implicit region identification, various features can be captured to represent the beginning point, ending point, and region between the points to which the annotation is to be anchored. Examples of such features include the closest section heading preceding or succeeding the mark, the number(s) of the paragraph(s) the mark is closest to, the page number of the mark, hash values of characters near the mark, and so forth. For example, the closest preceding section heading and page number may be features used for the beginning point, the closest succeeding section heading and paragraph number may be features used for the ending point, and a hash value (one per paragraph) calculated by hashing each of the paragraph(s) closest to the mark may be used analogously to the keywords discussed above.

In addition, an explicit region may be automatically generated based on the implicit proximity of the annotation to the content. For example, if the implicitly positioned annotation is "near" the third paragraph, choose the third paragraph as the region to which the annotation is anchored, and generate robust features from the third paragraph (as if the user had selected the third paragraph as the region to which the annotation corresponds).

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method in a computer system of anchoring an annotation to content, the method comprising:
   receiving an indication of a portion of the content;
   capturing by the computer system one or more features describing a beginning of the portion of the content;
   capturing by the computer system one or more features describing an ending of the portion of the content;
   capturing by the computer system one or more features describing a region between the beginning of the portion and the ending of the portion;
   generating by the computer system a histogram that identifies, for each word in the content, a frequency of occurrence of the word within the content, wherein the frequency of occurrence indicates the number of times the word appears in the content, and wherein the histogram is generated once for the content;
   associating by the computer system the annotation with the captured features,
      wherein the one or more features describing the region between the beginning of the portion and the ending of the portion comprise:
         an indication of one or more keywords in the region, wherein the keywords are selected by, using the generated histogram:
            identifying, for each word in the region, the frequency of occurrence of the word within the content, and
            selecting as the keywords one or more words in the region having lowest frequencies of occurrence within the content, and
         for each of the one or more keywords, a distance from the beginning of the portion to the keyword, and a distance from the keyword to the ending of the portion.

2. A method as recited in claim 1, wherein the captured features are independent of the format in which the content is stored.

3. A method as recited in claim 1, further comprising storing the captured features independently from the content.

4. A method as recited in claim 1, wherein the one or more features describing the beginning of the portion of the content comprise an offset indicating the location of a beginning point of the portion relative to a particular point in the content.

5. A method as recited in claim 4, wherein the particular point in the content comprises the beginning of the content.

6. A method as recited in claim 1, wherein the one or more features describing the beginning of the portion of the content comprise one or more characters of the content at a beginning point of the portion that either precede the beginning point or succeed the beginning point.

7. A method as recited in claim 1, wherein the one or more features describing the beginning of the portion of the content comprise a hash value generated from hashing one or more characters of the content located at the beginning of the portion.

8. A method as recited in claim 1, wherein the one or more features describing the ending of the portion of the content comprise an offset indicating the location of an ending point relative to a particular point in the content.

9. A method as recited in claim 8, wherein the particular point in the content comprises the beginning of the content.

10. A method as recited in claim 1, wherein the one or more features describing the ending of the portion of the content comprise one or more characters of the content at an ending point of the portion that either precede the ending point or succeed the ending point.

11. A method as recited in claim 1, wherein the one or more features describing the ending of the portion of the content comprise a hash value generated from hashing one or more characters of the content located at the ending of the portion.

12. A method as recited in claim 1, wherein the one or more features describing the region between the beginning of the portion and the ending of the portion comprise a length of the portion.

13. A method as recited in claim 1, wherein the beginning of the portion, the ending of the portion, and the portion are explicitly identified by a user.

14. A method as recited in claim 1, further comprising: identifying that the annotation corresponds to the portion of the content based on the received indication of the portion of the content, wherein the received indication is an implicit indication of the portion of the content.

15. A method as recited in claim 14, wherein the identifying comprises:
identifying a paragraph of the content based on a mark made by the user; and
using the paragraph as the portion of the content to which the annotation corresponds.

16. A method as recited in claim 1, wherein the content comprises one or more of: text content, image content, video content, and audio content.

17. A method as recited in claim 1, wherein the annotation includes one or more of: text content, video content, image content, and audio content.

18. A method as recited in claim 1, further comprising capturing one or more features describing an intermediate point of the portion of the content.

19. A method as recited in claim 18, wherein the one or more features describing the intermediate point comprise one or more characters of the content that either precede the intermediate point or succeed the intermediate point.

20. A method as recited in claim 18, wherein the one or more features describing the intermediate point comprise hash values generated from hashing one or more characters of the content located at the intermediate point.

21. A computing device having a processor and memory comprising:
an annotation marking engine configured to anchor an annotation to a portion of content, the annotation marking engine including,
a receiving module to receive an indication of the portion of content to which the annotation is to be anchored,
a beginning capture module to capture one or more features describing a beginning of the portion of content,
an ending capture module to capture one or more features describing an ending of the portion of content, and
a region capture module to:
generate a histogram that identifies, for each word in the content, a frequency of occurrence of the word within the content, wherein the frequency of occurrence indicates the number of times the word appears in the content, and wherein the histogram is generated once for the content, and
capture one or more features describing a region of the portion of content, wherein the region is between the beginning of the portion of content and the ending of the portion of content, wherein the region capture module captures the one or more features by using the generated histogram to:
identify, for each word in the region, the frequency of occurrence of the word within the content, and
select one or more keywords in the region, wherein the keywords include one or more words in the region having lowest frequencies of occurrence within the content; and
an annotation locating engine configured to receive the content after the content has been modified such that the portion of content has been revised, and further configured to identify a candidate portion of the modified content to which the annotation is to be anchored, the annotation locating engine including:
a candidate portion determination module to identify one or more candidate portions of the modified content for anchoring the annotation and to generate a score for each of the one or more candidate portions based on a comparison of the captured features to which the annotation was anchored and the identified one or more candidate portions;
a score comparator module to:
determine which of the one or more candidate portions the annotation is to be anchored to based at least in part on the generated score for the one or more candidate portions,
determine whether the generated score for the one or more candidate portions exceeds a threshold value, and
in response to determining that the generated score exceeds the threshold value, automatically select the candidate portion to which the annotation is to be anchored; and
a user interface module to, in response to determining that the generated score does not exceed the threshold value, query a user regarding whether at least one of the one or more candidate portions is the candidate portion to which the annotation is to be anchored,
wherein the modules are implemented as instructions stored in the memory for execution by the processor.

22. A computing device as recited in claim 21, wherein the content is stored in one format prior to being modified and stored in a different format after being modified.

23. A computing device as recited in claim 21, wherein the user interface module is further to display an interface that identifies a single candidate portion of the identified one or more candidate portions and allows the user to indicate whether the single candidate portion is the candidate portion to which the annotation is to be anchored.

24. A computing device as recited in claim 21, wherein the user interface module is further to display an interface including a portion selection input option that allows the user to cycle through displaying different ones of the identified one or more candidate portions.

25. A computing device as recited in claim 21, wherein the annotation locating engine further comprises:
a preferences module to maintain user preferences regarding one or more threshold values to be used in identifying which of the one or more candidate portions of the modified content that the annotation is to be anchored to.

26. A computing device as recited in claim 21, wherein the one or more features include a distance of each of the one or more keywords from the beginning of the portion of content to the keyword, and a distance of each of the one or more keywords to the ending of the portion of content.

27. A computing device as recited in claim 21, wherein the content comprises one or more of: text, content, image content, video content, and audio content.

28. A computing device as recited in claim 21, wherein the annotation includes one or more of: text content, video content, image content, and audio content.

29. A computing device as recited in claim 21, wherein the beginning of the portion of content, the ending of the portion of content, and the portion of content are explicitly identified by a user.

* * * * *